United States Patent [19]

Grodevant

[11] Patent Number: 5,796,222
[45] Date of Patent: Aug. 18, 1998

[54] SYSTEM FOR DRIVING AND CONTROLLING THE MOTION OF AN OSCILLATORY ELECTROMECHANICAL SYSTEM ESPECIALLY SUITABLE FOR USE IN AN OPTICAL SCANNER

[75] Inventor: Scott R. Grodevant, Hilton, N.Y.

[73] Assignee: PSC Inc., Webster, N.Y.

[21] Appl. No.: 699,223

[22] Filed: Aug. 9, 1996

Related U.S. Application Data

[63] Continuation of Ser. No. 331,411, Oct. 31, 1994, abandoned.

[51] Int. Cl.⁶ .................. H02K 29/08; G06K 7/10
[52] U.S. Cl. .................. 318/119; 318/685; 235/462; 235/470
[58] Field of Search .................. 318/119, 126, 318/127, 128, 129, 685; 250/235, 236; 358/296, 494; 235/462, 467, 469, 472; 359/202, 211, 212, 213, 834

[56] References Cited

U.S. PATENT DOCUMENTS

| | | | |
|---|---|---|---|
| 4,492,903 | 1/1985 | Knight et al. | 318/254 |
| 4,496,831 | 1/1985 | Schwartz et al. | 235/472 |
| 4,743,815 | 5/1988 | Gee et al. | 318/254 |
| 4,928,043 | 5/1990 | Plunkett | 318/254 |
| 5,015,831 | 5/1991 | Eastman | 235/462 |
| 5,057,753 | 10/1991 | Leuthold et al. | 318/254 |
| 5,115,120 | 5/1992 | Eastman | 235/462 |
| 5,200,597 | 4/1993 | Eastman | 235/455 |
| 5,247,384 | 9/1993 | Inoue et al. | 359/199 |
| 5,258,699 | 11/1993 | Grodevant | 318/685 |
| 5,262,627 | 11/1993 | Shepard | 235/472 |
| 5,281,801 | 1/1994 | Shepard et al. | 235/472 |
| 5,303,080 | 4/1994 | O'Brien et al. | 359/196 |
| 5,347,124 | 9/1994 | Narukawa et al. | 250/235 |
| 5,422,471 | 6/1995 | Plesko | 235/467 |

*Primary Examiner*—Steven L. Stephan
*Assistant Examiner*—Judson H. Jones
*Attorney, Agent, or Firm*—Foley & Lardner

[57] ABSTRACT

A computerized control system for driving an rotor which can carry a laser or a beam deflecting mirror and is actuated by a coil thereon electromagnetically coupled to a fixed magnet or a stepper motor coil. The rotor can be part of an electromechanical oscillatory system supported by flexures or the stepper motor can be electrically biased to produce, electrodynamically a restoring force. The back EMF of the coil is sensed, translated into successive digital signals which are processed in accordance with programs in firmware of the computer to generate driving pulses which are applied to the coil to obtain desired displacement motion of oscillation suitable for scanning the beam.

17 Claims, 19 Drawing Sheets

SYSTEM FOR DRIVING AND CONTROLLING THE MOTION OF AN OSCILLATORY ELECTROMECHANICAL SYSTEM ESPECIALLY SUITABLE FOR USE IN AN OPTICAL SCANNER

This application is a continuation of application Ser. No. 08/331,411, filed Oct. 31, 1994, now abandoned.

DESCRIPTION

The present invention relates to computer based systems (methods and apparatus) for generating and controlling electrical drive signals for actuation and control of the motion of electromechanical systems which oscillate reciprocally in opposite directions and particularly electromechanical systems for scanning an optical beam as from a laser across a field of view.

The invention is especially suitable for use in hand-held, portable optical symbol (especially barcode) scanners which enables the beam to scan the code over a desired scan angle and at a desired frequency, preferably the frequency where the electromechanical system is resonant so as to operate the scanner efficiently and conserve battery power.

Oscillating electromechanical systems as are commonly employed in hand-held, laser barcode scanners to translate an ongoing laser beam across a barcode target. In these devices, a mirror is mounted to the rotor of a two-phase stepping motor. (See U.S. Pat. No. 5,258,699, issued to S. Grodevant Nov. 2, 1993) or a flexure. (See U.S. Pat. Nos. 5,281,801 issued Jan. 25, 1994 or 5,262,627, issued Nov. 16, 1993). Alternatively, the laser may be mounted directly on a flexurally mounted rotor. (See U.S. Pat. Nos. 5,015,831, issued May 14, (1994 and 5,115,120 issued May 19, 1992 to J. Eastman). A computer with a microprocessor has been used to provide electrical drive signals to a motor cause the motor to oscillate. (See U.S. Pat. No. 5,200,597, issued Apr. 6, 1993 to Eastman et al. and U.S. Patent application Ser. No. 08/166,538 filed Dec. 14, 1993 by R. J. Boyd, et al. and assigned to the assignee hereof) or the electrical motor drive has used an analog control circuit. (See U.S. Pat. No. 4,496,831, issued Jan. 29, 1985). The laser beam is deflected from the oscillating mirror or is projected from the laser directly mounted to the rotor onto a barcode. Light returned the barcode is collected by collection optics at a photodetector. The photocurrent is amplified, signal processed and converted into a digital signal whose level represents the bar color (black bars and white spaces or vice versa) being scanned by the outgoing laser beam.

It is a feature of the invention to control oscillatory electromechanical scanning system having a rotor assembly wherein restoring forces are applied mechanically as with flexures which support the rotor as are electrodynamically produced as with a two-phase stepping motor, which oscillates the rotor with one phase biased with a DC current, and which behaves much like a flexure. In either case there is sufficient magnetic coupling present in the magnetic system; that is coupling in the electromechanical actuator in the electromagnetic system (between coil and magnet therein, one of which is connected to the rotor and the other of which is fixed), or in the stepping motor. Then physical movement of the rotor induces a detectable change in drive current. Amplification circuitry may be used for weakly coupled magnetic systems.

Features of the system provided by the invention include simplicity, low-cost, increased reliability and reduced printed-circuit board layout area. Because the behavior of the system is controlled exclusively by a control computer program (sometimes for convenience, called an algorithm hereinafter) that can reside in firmware, the system can be adapted for a wide variety of scanning applications by simply changing the program that is hardware modification is unnecessary. Low-cost and flexibility of application make the invention especially useful in scan engines, such as described in the following U.S. Patent Applications assigned to the assignee of this application: Ser. No. 07/985,371, filed Dec. 4, 1992; Ser. No. 08/138,313 filed Oct. 18, 1993 and Ser. No. 08/320,888, filed Oct. 5, 1994, and a patent application entitled Bar Code Reading & Scanning Apparatus, filed in the names of Anna Quinn and Jay Eastman on or about Oct. 31, 1994.

Electromechanical oscillating systems, especially those having rotors supported by flexures, tend to oscillate at mechanical resonant frequencies dependent upon the mass of their moving parts (the rotor) and their stiffness. Their oscillation is not damped after each cycle of oscillation when the Q (qualify factor) of the oscillating system is in the medium to high range (e.g., 10–50). This is usually the case for flexure supported electromechanically resonant oscillating systems and oscillations continue, even after driving signals stop. It then is necessary to synchronize the electrical driving signals, which may be a train of pulses, with the inherent resonant oscillations of the electromechanical system. Thus, an inherent problem associated with medium to high-Q resonant flexure systems as employed in hand-held barcode scanning systems is drive waveform synchronization. The need to synchronize the phase of the drive pulse train to a moving flexure's position stems from two conditions that are simultaneously present in hand-held barcode scanners and their operating environment. First is that scan activation is operator initiated and, as such, limited only by the operators ability to aim the scanner at successive barcode targets and activate a trigger switch. Thus, the off-period between successive scan activations can vary randomly, with a practical minimum being several hundred milliseconds. The second factor is that the friction forces within a flexure are substantially lower than in a bearing supported rotor as used within stepping motors, leading to Q values several times larger than for stepping motor systems. Such flexure systems continue to oscillate from several seconds to tens of seconds after driving power has been discontinued. Taken together, these two factors thus indicate that in many cases when the trigger is activated, scanning will be initiated while the flexure is still moving as the result of a prior scan.

It is very desirable to synchronize the drive pulse train during subsequent scan activation with the flexure's movement to conserve kinetic and potential energy in the system. Furthermore, failure to synchronize the drive pulse train can, depending upon the phase relationship between the drive pulse train and the flexure's movement, cause the flexure to completely stop oscillating (eventually to restart), leading to sluggish scanning response, and leaving an operator with the impression of unreliability. It is a feature of this invention to provide a drive and control system for a scanner which provides the requisite synchronization of the drive signal (pulses) with the oscillation of the electromechanical oscillatory system of the scanner.

In addition to producing digital barcode output, barcode scanners generate a second digital output, whose level indicates beam movement direction, that is called start-of-scan, or SOS. SOS is used by an external decoder as an aid to decoding, as by providing a framing window, because SOS changes state when the beam reverses direction. Thus, a valid barcode must reside between unlike (positive and negative going) SOS edges. Some decoders utilize SOS as an aid to picking valid barcode symbols out of the continuous stream of bar data produced by the scanner. Some barcode scanners generate this signal using optoelectronic components that monitor rotor motion. (See U.S. Pat. No. 4,820,911, issued Apr. 11, 1989 to K. Arackellian et al. or by digitally delaying the motor drive signal waveform. (See Eastman et al., U.S. Pat. No. 5,200,597 referenced above); or by processing the motor drive waveform with additional electrical circuits.

It is a feature of this invention to provide a scanner rotor drive and control system for generating the SOS signal, based on measuring rotor position, without the need for additional electrical or optical components as heretofore proposed.

Accordingly, it is the principal object of the present invention to provide an improved system for generating electrical signals for driving an electromechanical system to execute controlled rotational motion and particularly oscillatory motion which may be used to scan an optical beam reciprocally across a field of view.

It is another object of the present invention to provide an improved computer controlled system for generating electrical signals which drive an actuator of an electromechanical system to produce oscillatory motion thereof; the actuator being an electromagnetic actuator having a magnetically coupled coil and magnet, which move with respect to each other, or a motor.

It is a still further object of the present invention to provide an improved computer controlled system for driving an electromechanical structure which scans an optical beam reciprocally across a field of view and which is suitable for scanning symbols especially barcodes to obtain return light from which data representing the symbol can be derived and wherein the electromechanical structure may contain a rotor on which the source of an optical scan beam and a collector or optical element (a mirror) for collecting return light and the actuator (preferably the coil thereof) is mounted on flexures which provide mechanical storing force, or the electromechanical system may use a motor which is connected to provide the restoring force electrodynamically, as by maintaining a direct current (DC) bias in a stator coil of the motor.

It is still another object of the present invention to provide an improved drive and control system for an electromechanical, optical beam scanning system wherein the velocity of the reciprocal motion of a body of the electromechanical system (a rotor which oscillates reciprocally) which carries the source of the scanning beam or a deflector which deflects the beam and therefore the velocity of the beam across the field of view, can be monitored and controlled.

It is still another object of the present invention to provide an improved system for driving and controlling the motion of an electromechanical optical beam scanning system having a rotor body whereby the total angular displacement of the rotor body may be regulated to control the length of the scan pattern (i.e., the scan angle of the beam).

It is still another object of the present invention to provide an improved system for generating and controlling signals which drive a reciprocally moveable or oscillatory electromechanical system at an oscillation rate at or near the frequency at which the electromechanical oscillatory system is mechanically resonant.

It is a still further object of the present invention to provide an improved system for driving and controlling an electromechanical oscillatory system of an optical beam scanner wherein the frequency of the drive signals are varied to accommodate changes in the system which affect its resonance frequency such as environmental conditions (e.g., temperature and wear over time).

It is a still further object for the present invention to provide an improved system for driving and controlling an oscillatory, electromechanical optical beam scanning structure, which system is software controlled and in which the motion, initial position, displacement angle over which the structure oscillates, velocity and other operating characteristics of the oscillatory mechanical system of the structure can readily be modified to accommodate various applications, especially for barcode scanning.

It is a still further object of the present invention to provide an improved system for generating electrical signals for driving and monitoring the motion of an oscillatory mechanical system which scans a laser beam reciprocally in opposite directions across a field of view, which can contain an optically readable symbol such as a barcode, to provide signals indicating the direction, duration and start of each scan in each direction, which signals may be called start of scan (SOS) signals.

It is a still further object of the present invention to provide an improved system wherein the electromechanical oscillatory structure includes an actuator, such as a stepper motor, which has a non-linear torque versus electrical drive current amplitude characteristic and which compensates for such non-linearity to obtain linear displacement versus time characteristics thereby facilitating derivation of data from the return light when the structure is used for scanning a barcode.

It is a still further object of the present invention to provide an improved system for driving an electromechanical oscillatory system into oscillation which is adopted for computer control with a low cost microprocessor based computer (e.g., an eight-bit microprocessor) and which drive and control system does not impose an overhead (use of memory and computation power of the computer) which interferes with the use of the computer for other tasks in addition to the driving of the electromechanical system such as control of the gain of amplifiers which process signals corresponding to the return light from a barcode which is scanned using the electromechanical system and the optical power produced by the optical source such as a laser diode which provides the beam which is scanned in accordance with the oscillatory motion of the electromechanical system.

The foregoing and other objects, features, and advantages of the invention will become more apparent from a reading of the following description in connection with the accompanying drawings in which:

FIG. 1 is a schematic diagram of a system for generating pulses and driving and controlling the motion of an oscillatory mechanical system having a coil either of a stepper motor or a coil of an electromagnetic actuator in accordance with a first embodiment of the invention wherein digital components of a control computer are illustrated in block form; FIG. 2 is a flowchart of a first control algorithm called GOCAL in accordance with which the computer system of control system 1 shown in FIG. 1 and the other control systems which are shown in figures hereinafter described may be programmed;

FIG. 3 is a flowchart of the scanning control algorithm 1 which may be programmed in the computer of control system 1 shown in FIG. 1 and computers of other control systems (control system 2, 3 and 4) which are shown in the figures described hereinafter;

FIG. 4 is a flowchart of GOCAL control algorithm 2 which may be programmed in control system 1 shown in FIG. 1 and in the control systems 2–4 which are described hereinafter;

FIG. 5 is a flowchart of the scanning, GODRIVE algorithm 2 which may be programmed in the computers of control system 1 shown in FIG. 1 and the computers of the control systems 2–4 shown in figures described hereinafter;

Figure 8:
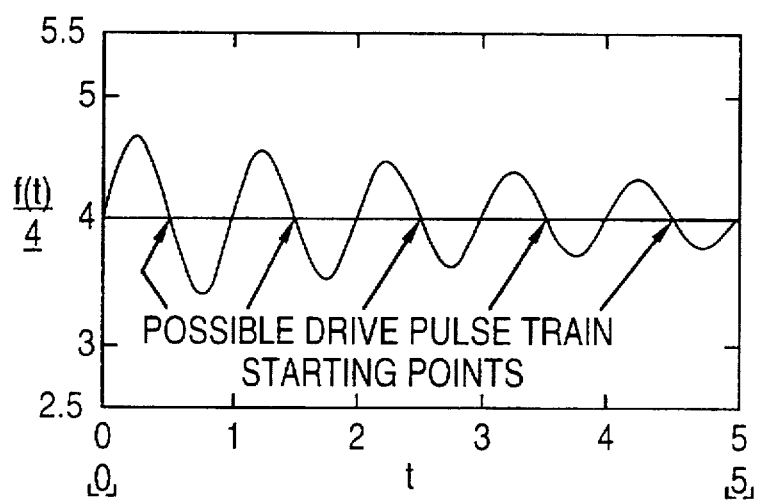
Figure 9:
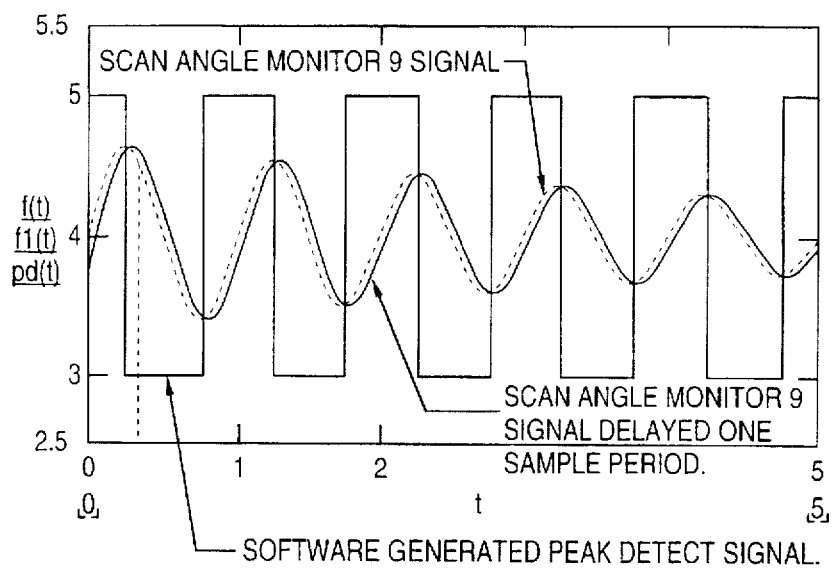
Figure 12:
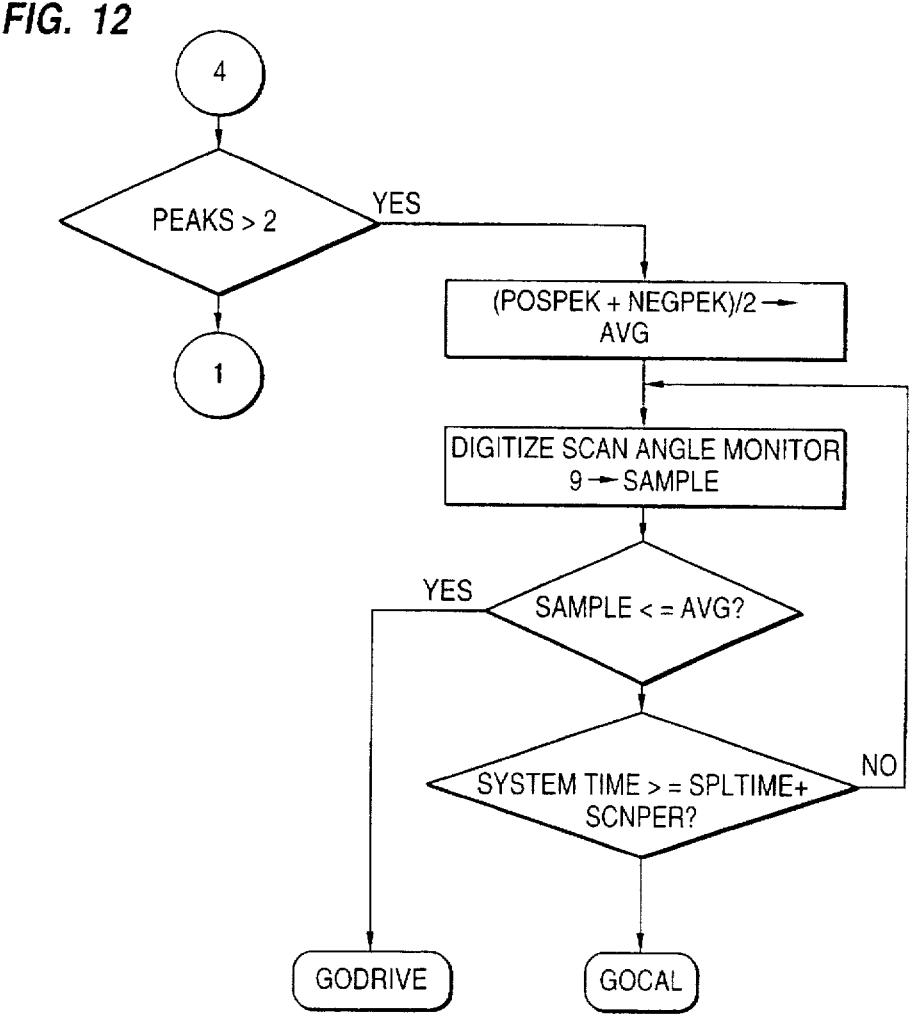
Figure 10:
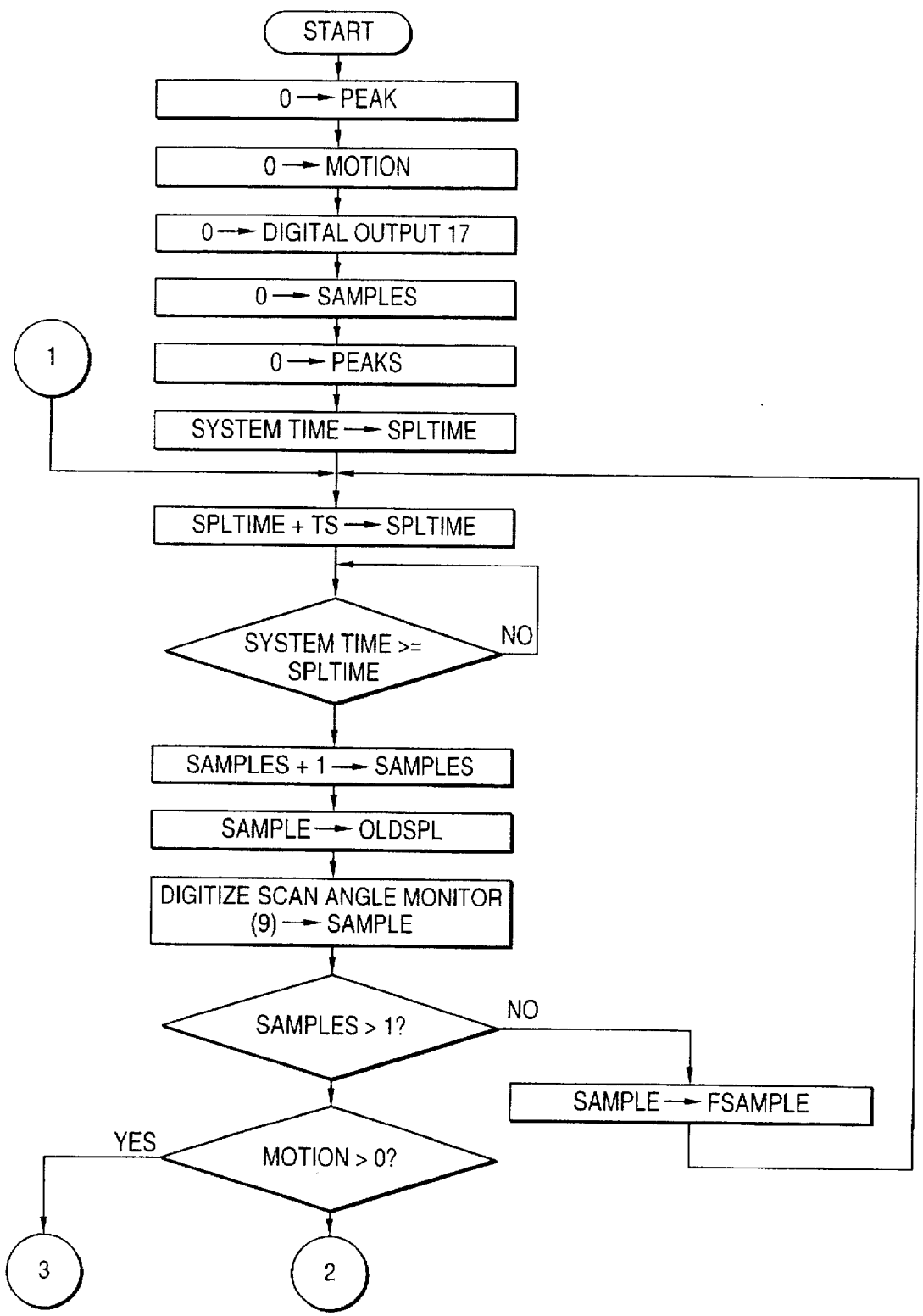
Figure 11:
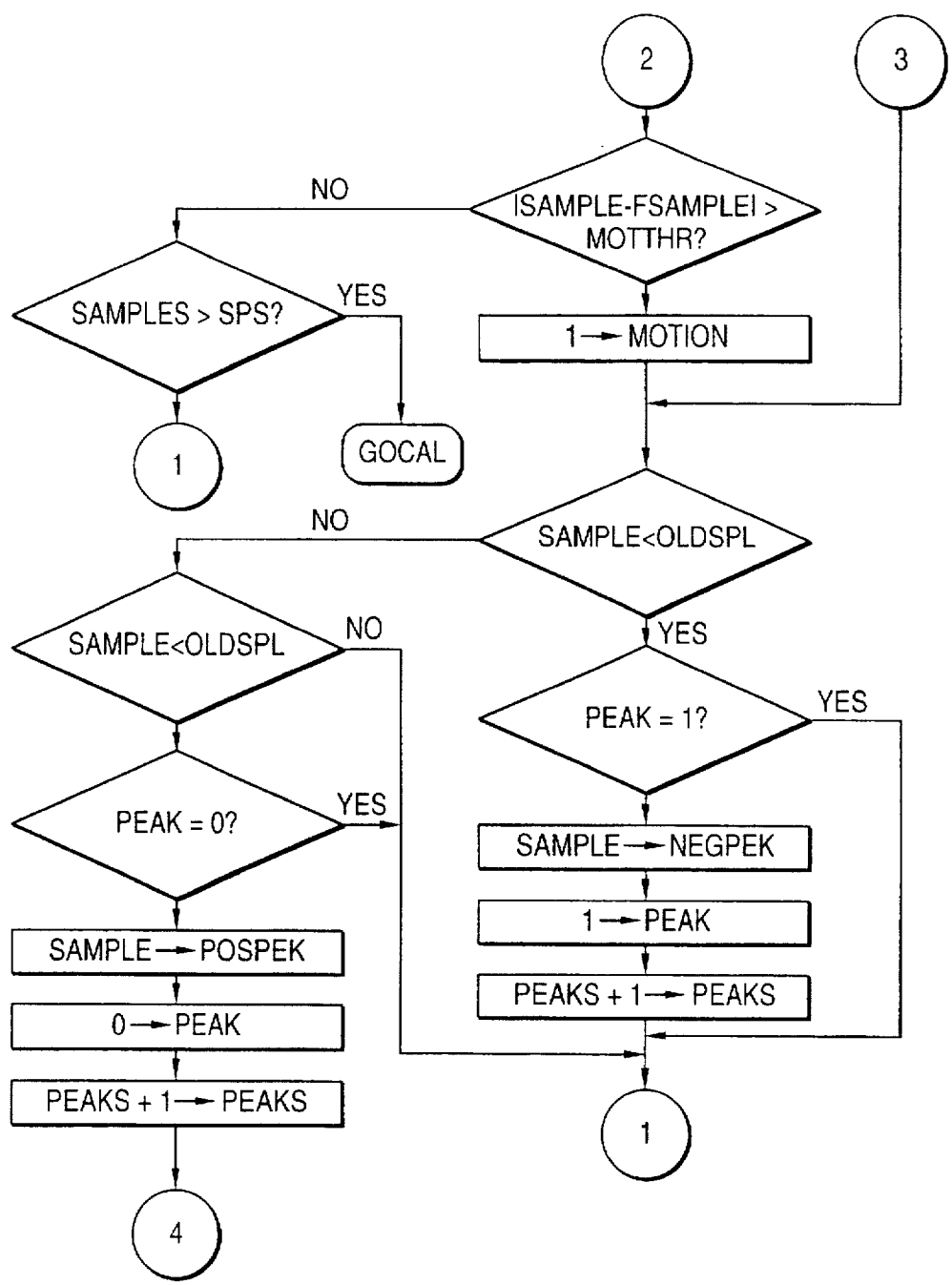
Figure 13:
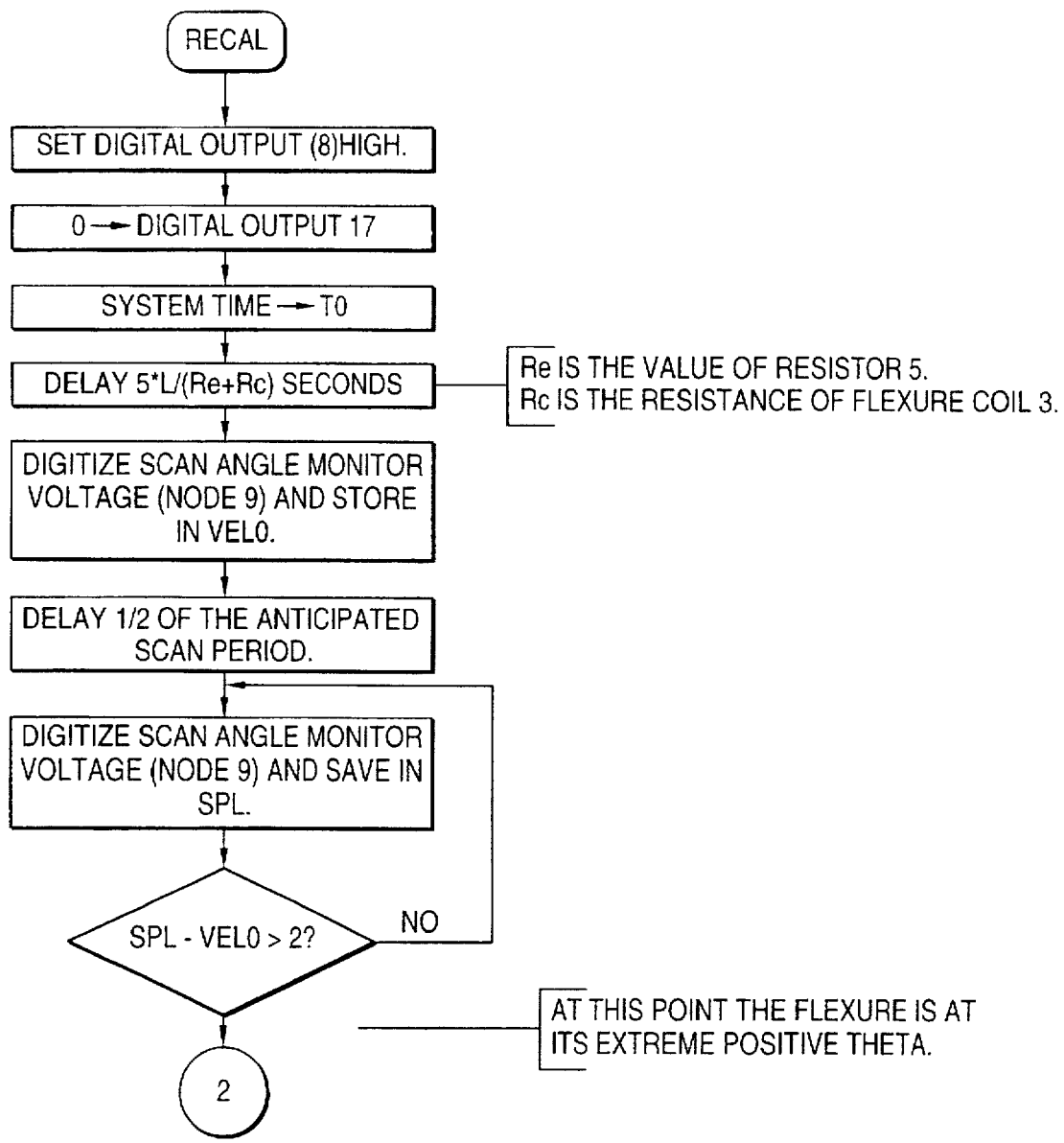
Figure 14:
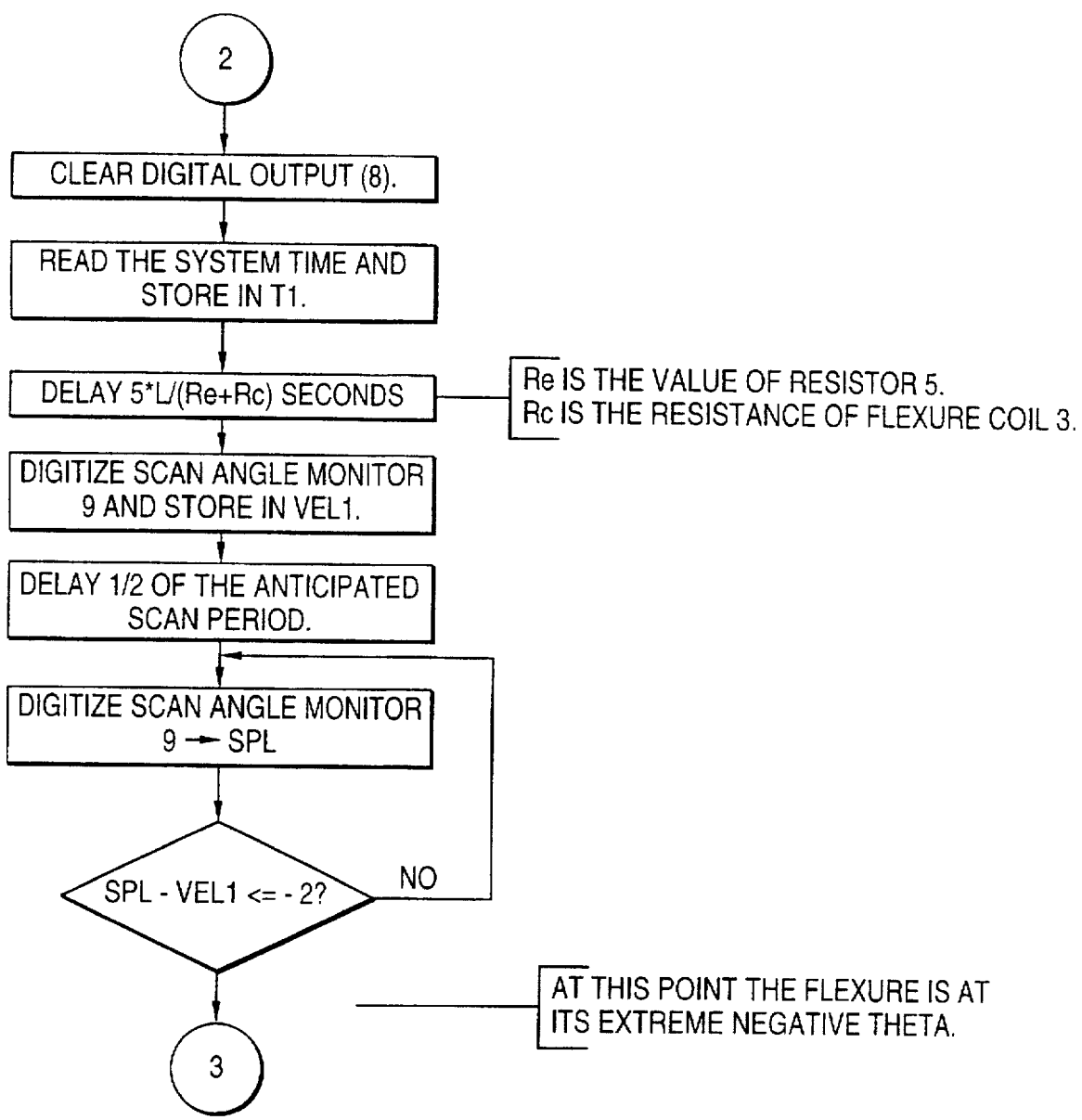
Figure 17:
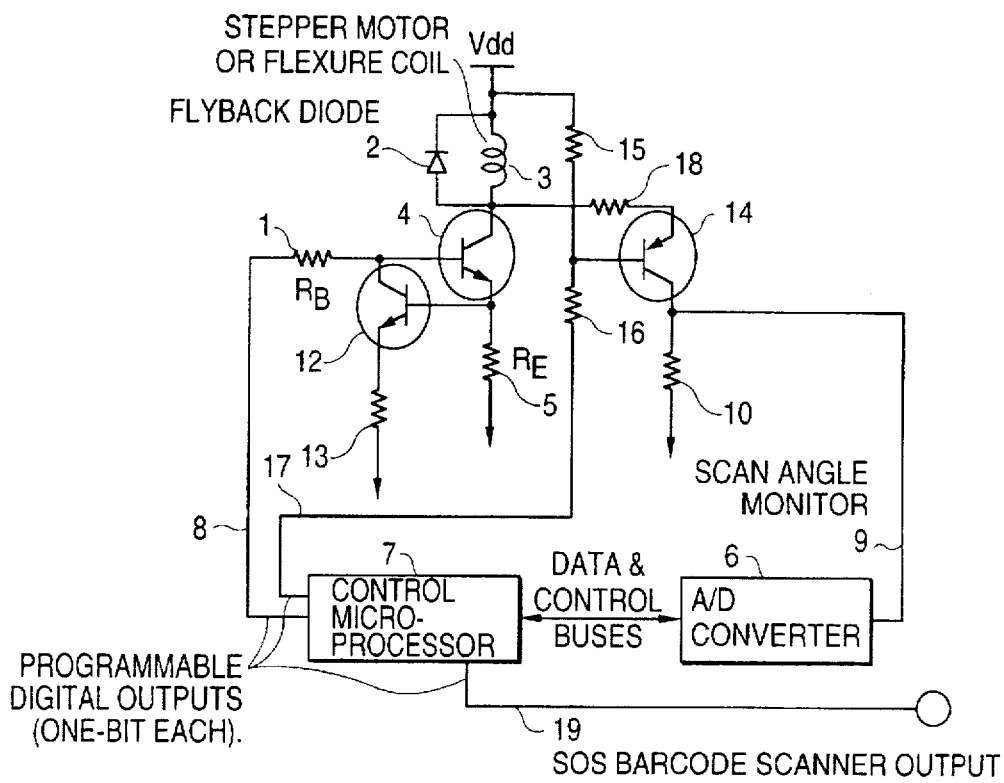
Figure 18:
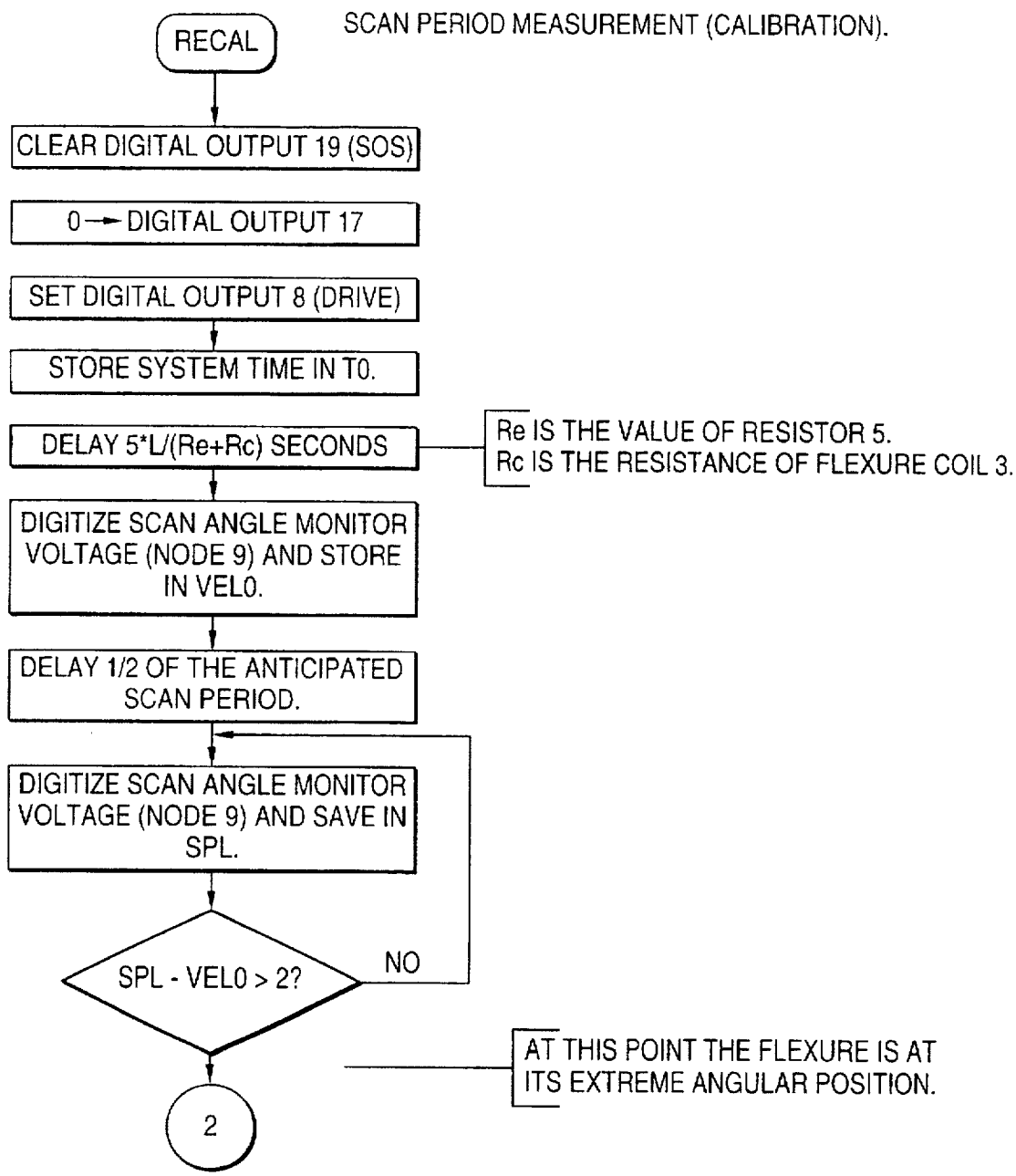
Figure 19:
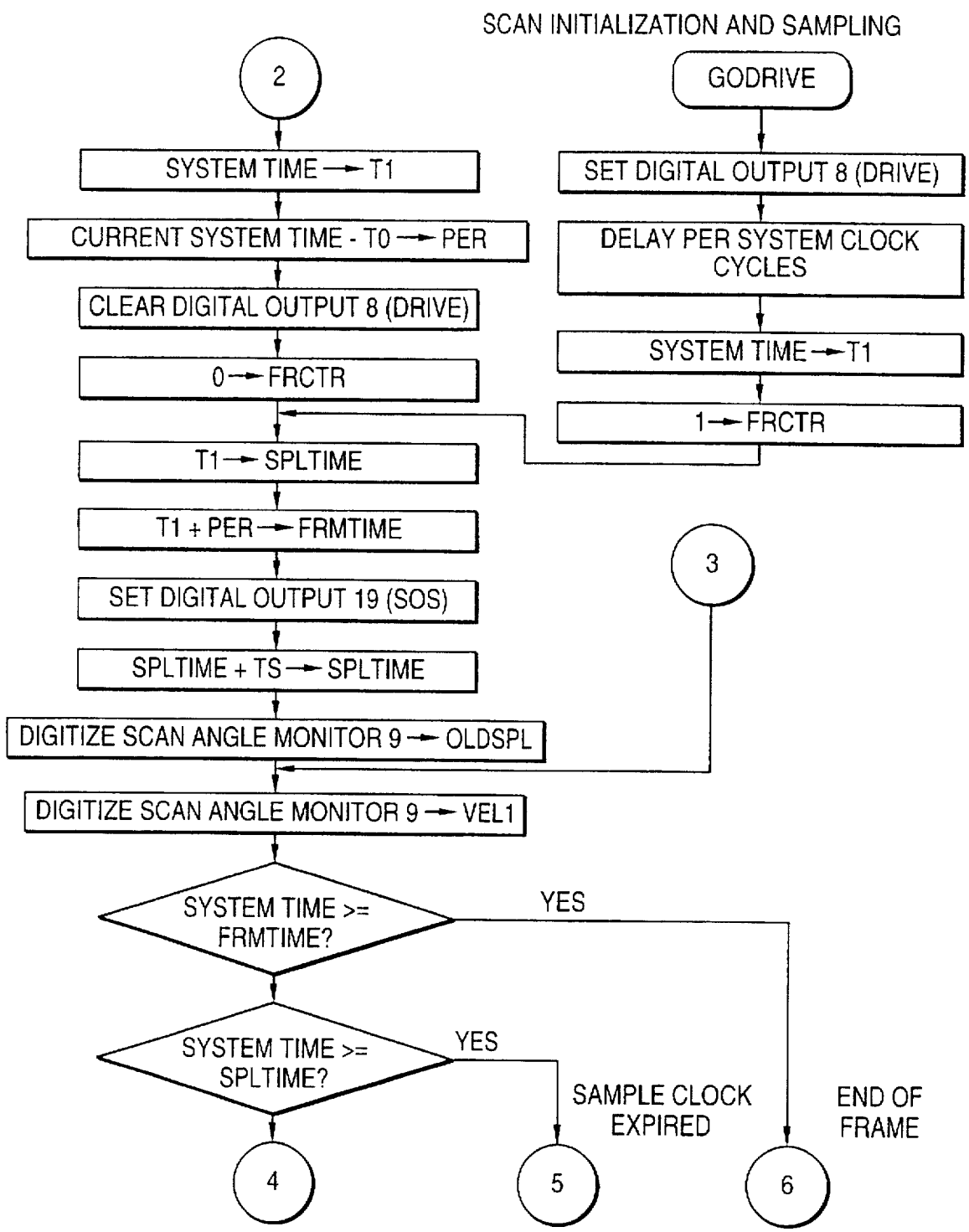
Figure 20:
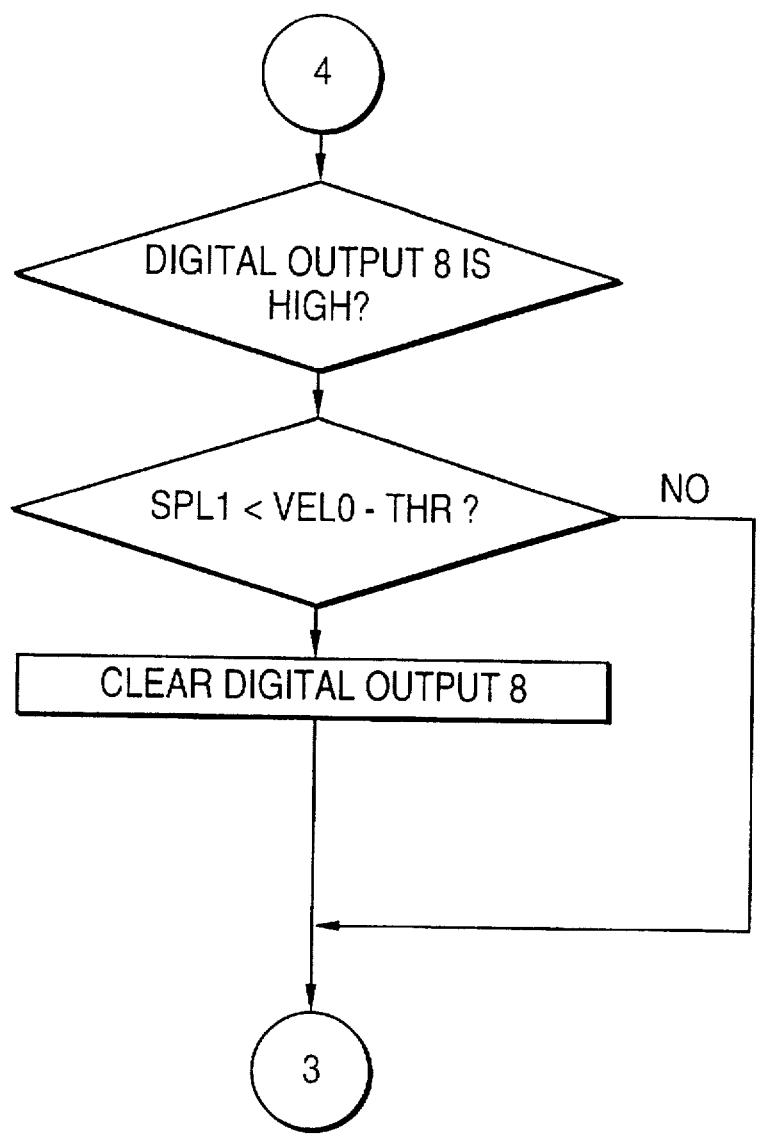
Figure 21:
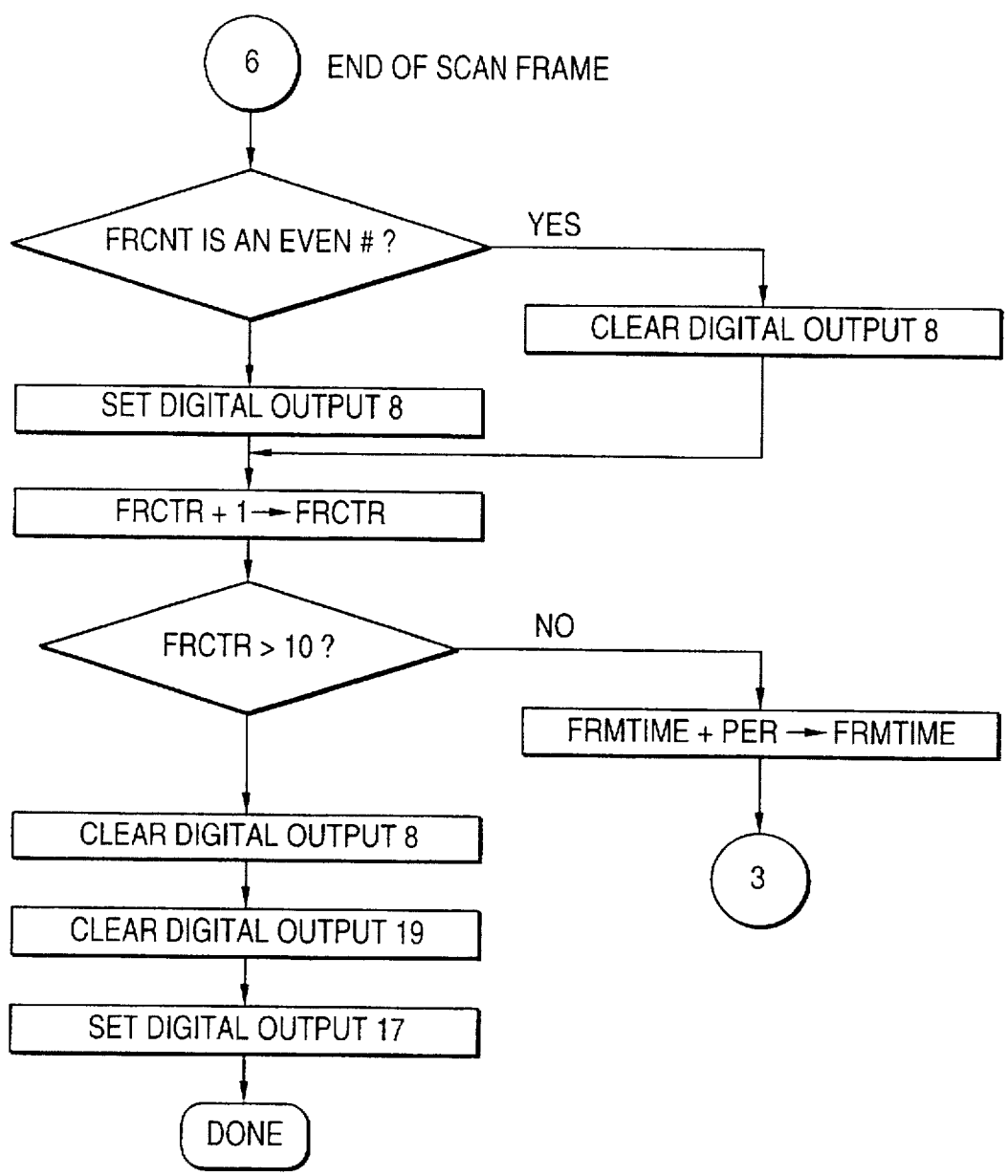
Figure 22:
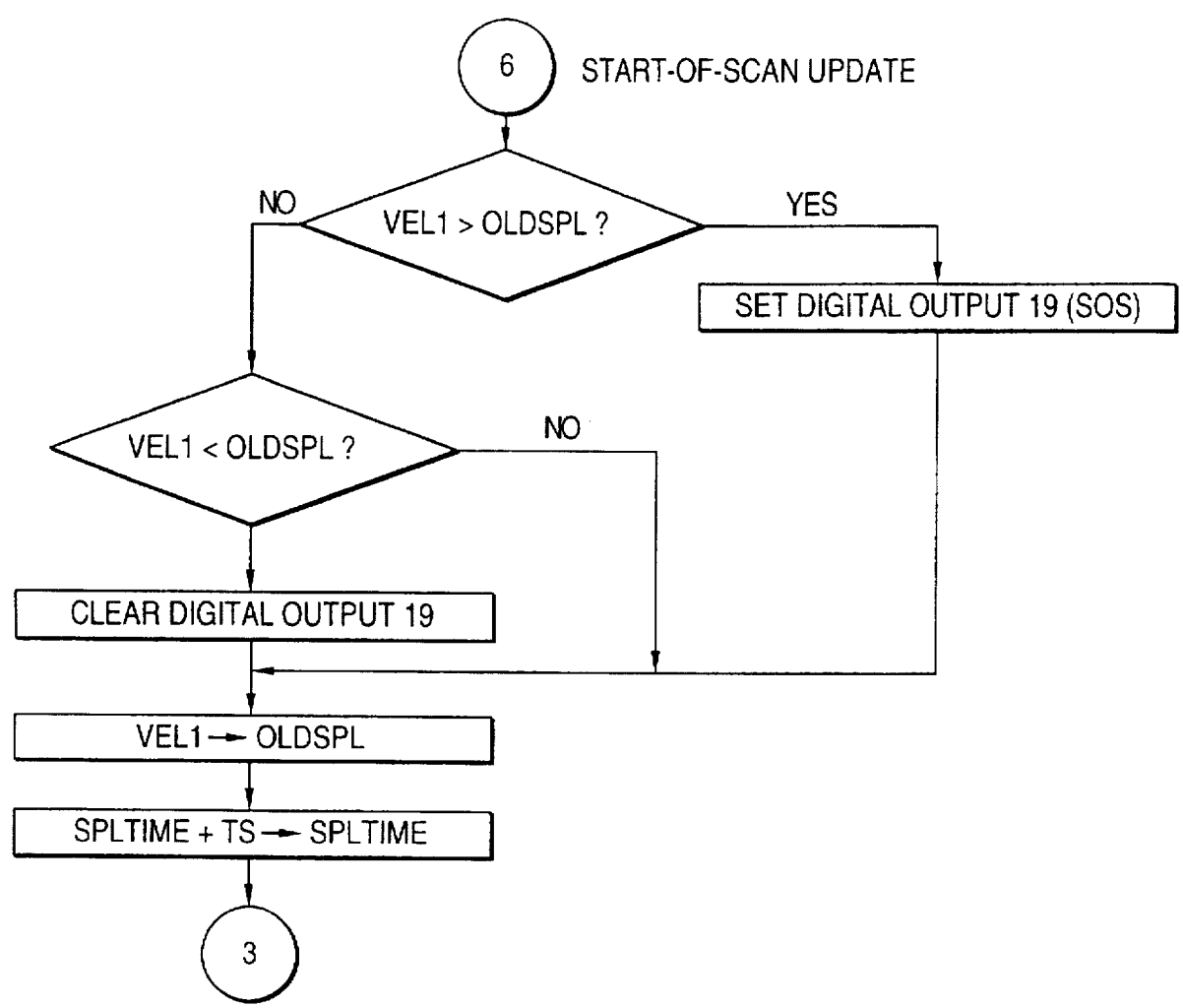
Figure 23:
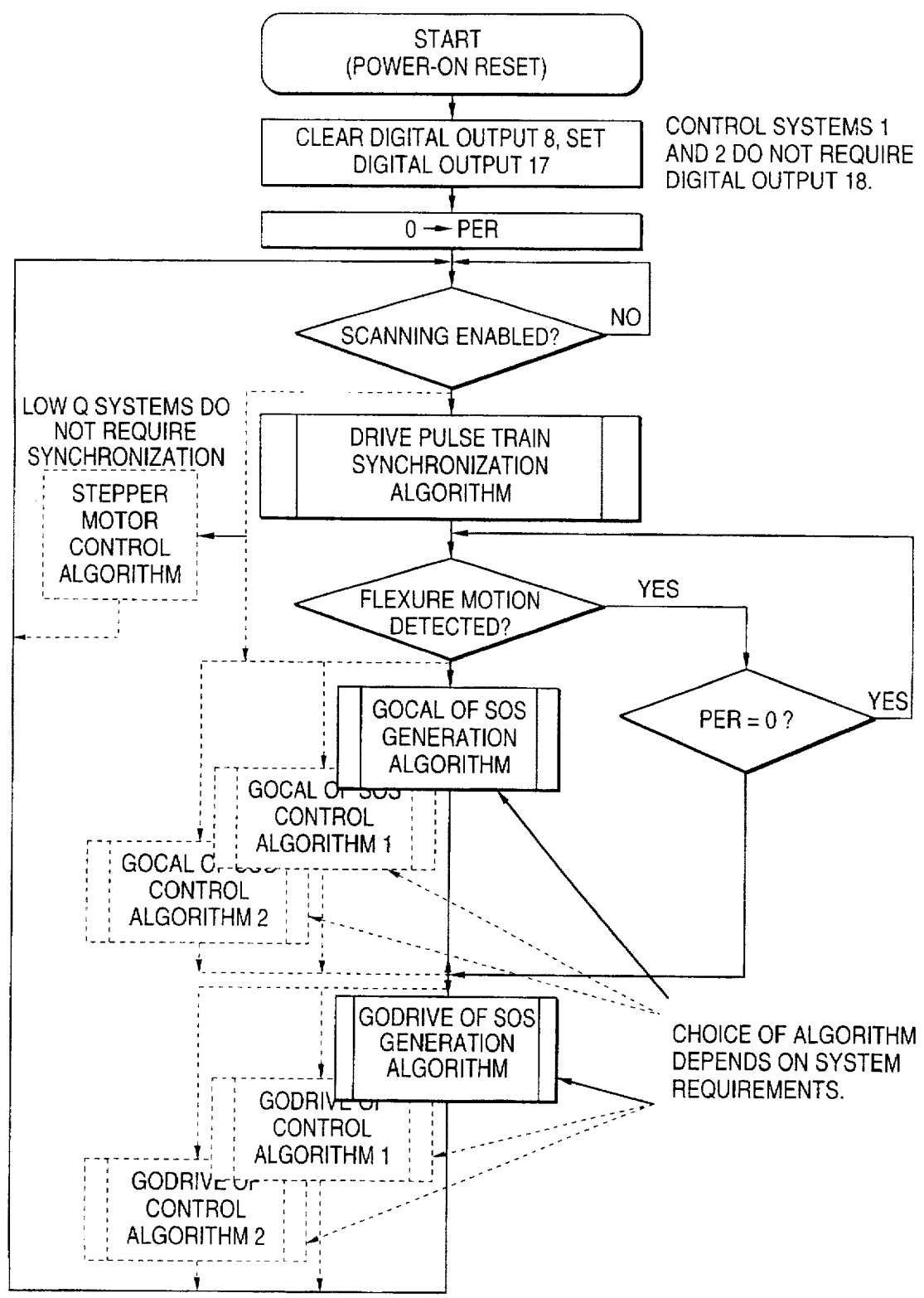

FIG. 8 is a waveform showing the oscillatory motion of the electromechanical system which is driven and controlled by the drive and control systems 1, 2, and 3 as obtained from the scan angle monitor output 9 of these systems;

FIG. 9 is a plot of the scan angle monitor output and a corresponding output delayed in time showing the processing of these outputs to detect the peak amplitude locations of the scan angle monitor output;

FIGS. 10–12 taken together is a flowchart illustrating the algorithm for synchronizing the drive pulses generated in the control systems 1–4 and which may be programmed in the computers of those control systems;

FIGS. 13, 14, 15, and 16 taken together constitute a flowchart of an algorithm called RECAL which can replace the GOCAL and GODRIVE algorithms when the electromechanical system is driven by a stepper motor;

FIG. 17 is a schematic and block diagram of a drive and control system for electromechanical oscillatory structures in accordance with another embodiment of the invention and called control system 4;

FIGS. 18, 19, 20, 21, and 22 taken together constitute a flowchart of the SOS (start of scan) signal generation algorithm which may be programmed in the computers of control systems 1, 2, 3, and 4 shown in FIGS. 1, 6, 7, and 17, respectively; and FIG. 23 is a chart illustrating the architecture of the algorithms of the software (computer programs) which may be programmed in the computer of the control systems illustrated in FIGS. 1, 6, 7, and 17.

Four different embodiments of computerized scanner drive signals generation and control systems are described herein and named Control Systems 1 through 4. Also described are several computer programs (called for convenience algorithms) which are embodied in software or firm ware of the computers of these systems, and provide the systems with differing capabilities. The flow charts present these algorithms. A method of monitoring rotor position for the purpose of generating the start-of-scan signal is integrated with the SOS control algorithm (FIGS. 18–22). The control systems and their associated control algorithms advance the state of the art in oscillating electromechanical system control, and are particularly well suited to hand-held, low-cost barcode scanning applications. All systems presented automatically adapt their drive frequency to match the resonance frequency of their electromechanical system and are adapted to perform closed-loop rotor excursion (scan angle) control, in this application. The first system (FIG. 1), although not the presently preferred embodiment of the invention, is well suited for stepper motor applications, whose Q values are generally low enough so that drive pulse train synchronization is not critical, although even this system can be used to accomplish drive pulse synchronization. The second system (FIG. 6), facilitates loss-less drive pulse train synchronization. The third system (FIG. 7) overcomes and provides signal gain for weakly magnetically coupled electromechanical systems. The fourth system (FIG. 17), which is the preferred embodiment, adds start-of-scan generation to the features of the other systems.

Because all systems are microprocessor controlled, more advanced control algorithms can be developed, without hardware change, simply by replacing the microprocessor's operating firmware. An algorithm may, for example, control the start-up characteristics of the scanning mechanism to providing more desirable barcode scanning characteristics. A practical algorithm is discussed in connection with FIGS. 13–16 that compensates for the unbalanced torque present in low-cost stepping motors.

Frequent reference is made within this document to several terms that are particular to barcode scanning equipment, here is a description of these terms:

SCAN is the movement of the laser spot across a barcode target, either from right-to-left or vice versa. A scan is equivalent to rotor movement between its angular extremes (fully counterclockwise to fully clockwise or vice versa).

SCAN PERIOD is the amount of time required to accomplish a "scan". The scan period is exactly one-half the period of the drive waveform applied to the drive coil of the stepping motor or flexure, because each cycle of the drive waveform produces two scans.

SCAN FREQUENCY is the number of times per second the rotor is moved between its angular extremes. Scan frequency is double the frequency of the drive waveform. Typical scan frequencies in hand-held barcode scanners are between 20 and 40 scans per second.

The following terms are used to describe variables in the control algorithms.

Control Algorithm 1 (FIGS. 2 and 3) references these variables: TO, VELO, SPL, PER, and CTR, which are described below.

| | |
|---|---|
| TO | is the system time when coil 3 drive's current was initiated. TO is used as the reference time for scan period calculation. |
| VELO | is the initial sample of scan angle monitor 9. VELO is taken to be the bias value of scan angle monitor 9 since scan angle calibration is performed only when the rotor is motionless. |
| SPL | is the current sampled value of scan angle monitor 9. |
| PER | is the computed scan period, in units of the system time. |
| CTR | is a counter that contains the number remaining scans to be performed. |

Control Algorithm 2 (FIGS. 4 and 5) references these variables: TO, VELO, SPL, PER, CTR and the symbolic constant THR, which are described below.

| | |
|---|---|
| CTR | is a counter that contains the number remaining scans to be performed. |
| PER | is the computed scan period, in units of the system time. |
| SPL, | are the current sampled value of scan angle monitor 9. |
| SPL1 | SPL is used in the calibration loop, SPL1 in the scanning loop. |
| TO | is the system time when coil 3 drive's current was initiated. TO is used as the reference time for scan |

-continued

| | |
|---|---|
| | period calculation. |
| VELO | is the initial sample of scan angle monitor 9. VELO serves as a reference point for determining when the rotor has moved through its total angular excursion. VELO is taken to be the bias value of scan angle monitor 9 since scan angle calibration is performed only when the rotor is motionless. |
| THR | is a positive, nonzero constant whose value is proportional to total rotor excursion (scan angle). The value of THR is experimentally determined to produce the desired scan angle. |

Stepper Motor Control Algorithm (FIGS. 13–16) references these variables: TO, VELO, SPL, T1, VEL1, $T_{FORWARD}$, $T_{REVERSE}$, CTR, and the symbolic constant THR, those descriptions follow.

| | |
|---|---|
| TO | is the system time at which coil 3 current was initiated. TO is used as a reference time for the forward scan period calculation. |
| VELO | is the initial sample of scan angle monitor 9 taken at the start of the forward scan period. VELO serves as a reference point for determining when the rotor has moved through its total forward angular excursion. VELO is taken to be the bias value of scan angle monitor 9 when transistor 4 is on. |
| SPL | is the sampled value of scan angle monitor 9. |
| T1 | is the system time at which the forward scan ended and the reverse scan began. The difference between T1 and TO is the forward scan period. |
| VEL1 | is the initial sample of scan angle monitor 9 taken at the start of the reverse scan period. VEL1 serves as a reference point for determining when the rotor has moved through its total reverse angular excursion. VEL1 is taken to be the bias voltage of scan angle monitor 9 when transistor 4 is off. |
| $T_{FORWORD}$ | is the measured forward scan period, the difference between T1 and TO. |
| $T_{REVERSE}$ | is the measured reverse scan period. |
| CTR | counts the number of scans performed during scanning. |
| THR | is a positive, nonzero constant whose value is proportional to total rotor excursion (scan angle). The value of THR is experimentally determined to produce the desired scan angle. |

The SOS Generation Algorithm (FIGS. 18–21) references these variables: TO, VELO, SPL, T1, PER, FRCTR, SPLTIME, FRMTIME, OLDSPL and the symbolic constant; THR which are described as follows. TO, VELO, SPL, PER, OLDSPL and THR are used as described earlier.

| | |
|---|---|
| T1 | is set to the value of system time at which scanning begins. It allows the algorithm to be entered from calibration or from its GODRIVE entry point. |
| FRCTR | counts the number of scans performed. FRCNT is also used to differentiate the forward scan from the reverse scan, as indicated by its value being even or odd. During forward scans scan angle control is performed. |
| SPLTIME | is the next system time at which a peak detector sample is to be processed. SPLTIME is used in conjunction with TS to establish the sampling rate for SOS generation. |
| FRMTIME | is the system time at which the current scan will be complete. FRMTIME is advanced in increments of the measured scan period. PER. |

Referring first to FIG. 23, there is shown a system level flow chart that shows how control is passed between the various algorithms and how they can be interchanged depending upon the system's operating requirements and its electromechanical construction. The preferred embodiment is shown in dark lines, alternatives are shown in dotted lines.

Control Algorithm 1 is used when neither scan angle control nor SOS is desired. Control Algorithm 2 is used when scan angle control is desired and an SOS output is not (desired). The SOS Generation Algorithm is used with both scan angle control and an SOS output are needed. Algorithm 1 (GOCAL, GODRIVE) is used for systems constructed using stepping motors when no SOS output is desired.

If the mechanical system has a sufficiently low Q, drive pulse train synchronization is not necessary, thus the Drive Pulse Train Synchronization Algorithm is omitted.

Although not explicitly shown, a digital input signal (controlled by an external barcode decoder) is monitored by control microprocessor 7 (see FIGS. 1, 6, 7 and 17) to determine when scanning is to be performed. This state of this signal is monitored, as shown in FIG. 23, as well as within all sampling loops of the control algorithms. If this signal switches false, all loops immediately exit, returning control to the main program loop shown in FIG. 23.

The value of PER (used to store the most recently measured scan period), is initialized to zero. When scanning is initiated for the first time, should motion be detected, the initial state of PER allows the program to detect that no prior calibration (scan period measurement) has occurred. Under these conditions, there the process waits for mechanical motion to stop before calibration can be performed.

NGS-LC FLEXURE DRIVE INFORMATION

Figure 1:
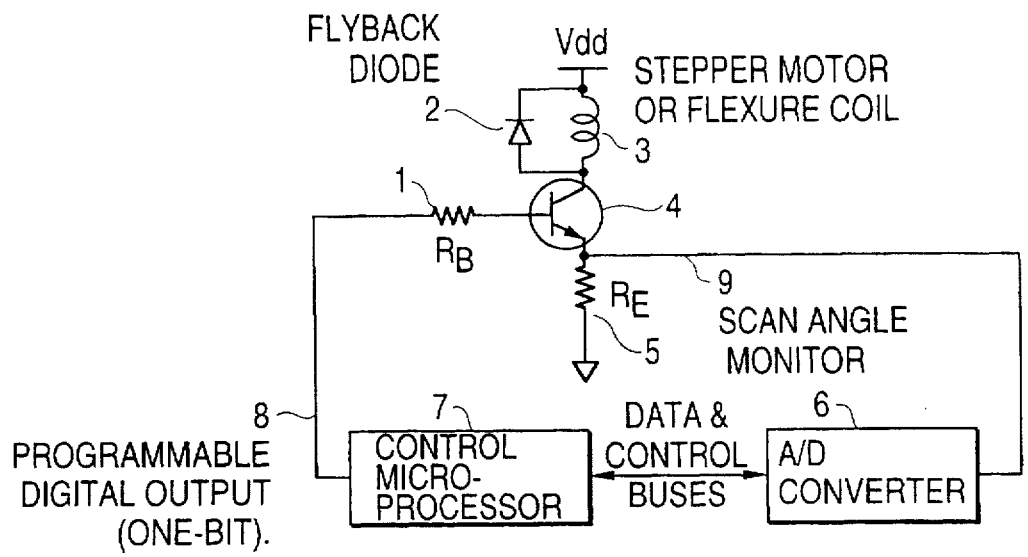

FIG. 1 shows the first embodiment of the invention consisting of: control microprocessor 7 (part of the control computer of a hand held barcode scanner such as shown in the Eastman, et al. Pat. No. 5,200,597 referenced above), resistor 1, drive transistor 4, diode 2, flexure coil 3 (mounted on the rotor of the oscillatory electromechanical system carrying the laser diode and collecting mirror mounted on flexures which provide restoring forces such as shown in Eastman U.S. Pat. No. 5,015,831, also referenced above), resistor 5 analog-to-digital (A/D) converter 6, scan angle monitor 9 and programmable digital output 8. Although A/D converter 6 is shown separate from control microprocessor 7 for clarity, many manufacturers offer integrated circuits containing both circuits, Motorola's 68HC705P6 microprocessor is an example.

A/D converter 6 is a conventional 8-bit, ratiometric converter, whose upper and lower reference voltages are equal to $V_{DD}$ and ground, respectively. In this configuration, the voltage of scan angle monitor 9 is quantized according to:

Equation 1:
A/D Conversion Trasnsfer Function $$D = \frac{V_9}{V_{DD}} 255$$

In the following discussion coil 3 and flexure 3 can be one of the coils of a two-phase stepper motor or the drive coil of a flexure supported rotor.

Resistors 1 and 5, in conjunction with transistor 4 form a saturated switch that conducts current through coil 3 under control of the programmable digital output 8 of control microprocessor 7. When digital output 8 is high, base current is supplied to transistor 4, causing it to saturate and conduct current through coil 3. Conversely, when digital output 8 is low, no base current is supplied to transistor 4, thereby turning it off. Resistor 5 performs two functions: it reduces the circuit's dependency upon transistor 4's gain ($h_{FE}$) and limits the current flow through coil 3 to a desirable value. Diode 2 acts as a flyback diode, suppressing transients created when transistor 4 is quickly turned-off.

The response of the flexure to a drive current pulse applied to coil 3 will be understood from the following discussion: Control microprocessor 7 initiates scanning by setting digital output 8 to a logic high. Digital output 8 being high, causes transistor 4 to saturate allowing current to flow through flexure coil 3. Transistor 4 saturates otherwise its emitter current is independent of its collector voltage thereby attenuating the flexure's EMF signal. The current flow through flexure coil 3 creates a magnetic field around the coil, that interacts with a permanent magnet mounted on the flexure base (the fixed structure where the flexure is anchored) creating a torque that deflects the rotor from its center position. This torque u called a $T_{drive}$ consider that a positive current deflects the rotor in a positive theta (angular) direction. Because the coil is now moving in a magnetic field, a voltage is induced that opposes the flow of drive current reducing the drive current in coil 3. The induced voltage is commonly called back EMF. The flexure supporting members provide a counter torque proportional to the rotor's angular deflection in a direction that opposes the deflection (so the torque always tends to drive the rotor to its zerod degree or center position), this torque is named $T_{flex}$. The net rotor torque is then given by: $T_{net}=T_{drive}+T_{flex}$. When coil drive current is applied with the rotor at its nominal center ($\theta=0$), $T_{flex}$ is zero and the highest net torque is applied to the rotor. This torque causes the rotor to accelerate in a positive $\theta$ direction. As the rotor's angle increases, the net torque is reduced because $T_{flex}$ becomes increasingly negative. As the rotor angle continues to increase the net torque drops to zero, but due to the rotor's inertia, $J_r$, it will overshoot the zero-torque angle. The zero torque angle is the angle at which $T_{drive}=-T_{flex}$. At this angle the net rotor torque is zero. As the rotor passes the zero-torque angle, the net torque is negative and the rotor accelerates toward its zero degree position. Depending upon the mechanical system's "Q" (determined by the relationship between $J_r$, $T_{flex}$ and $T_{drive}$), the rotor will settle at the "zero-torque" angle after several cycles of oscillation at its resonant frequency.

Once the flexure has settled at the "zero-torque" angle, if control microprocessor 7 discontinues the drive current by clearing digital output 8, the net rotor torque is negative due to $T_{flex}$. The negative torque causes the rotor to accelerate toward its zero angle position. As the rotor accelerates, a voltage is induced in the flexure coil that is again proportional to the rotor's angular velocity, but because transistor 4 is off, this voltage causes no collector or emitter current fluctuation (there are, however, voltage fluctuations present at the collector of transistor 4. For this polarity of rotor velocity, the voltage at the collector of transistor 4 exceeds the system power supply (labeled Vdd), causing diod 2 to begin conduction, effectively clamping the voltage at the collector of transistor 4 to one forward diode-drop above Vdd.

How the system controls the electromechanical flexure supported system (called flexure on short) will be more apparent from the following discussion: When current is initially applied to the flexure coil, the rotor accelerates. As the rotor's speed increases, a voltage is induced across coil 3, which is moving in the presence of the magnetic field created by the permanent magnet attached to the stationary part (stator) of the flexure assembly. The induced voltage opposes the flow of current produced by the drive circuit thus reducing the drive current by an amount proportional to the rotor's angular velocity. If the electromagnetic interface is constructing the with the coil in close proximity to the permanent magnet (strong magnetic coupling), the constant of proportionality (see "B" in Equation 4) can be made sufficiently large to insure the rotor's angular velocity produces A/D reading deviations in the tens to hundreds of counts. This voltage change at scan angle monitor 9 is used to control the oscillation motion of the electromechanical system (the flexure), as it allows control microprocessor 7 in conjunction with A/D converter 6 to monitor rotor velocity.

Since the rotor's angle, $\Theta(t)$, is related to its velocity, $\omega(t)$, by the fundamental law of circular motion:

Equation 2:
General Rotor Angle-Velocity Relationship $$\Theta(t) = \int_0^t \omega(t)dt$$

and any arbitrary periodic waveform applied to coil 3, that produces a non-zero rotor movement must result in a periodic velocity waveform, it follows that the maximum value of the velocity waveform must be related to the maximum angular excursion of the rotor. Thus, the peak velocity value is proportional to the peak angular excursion, which is controlled and regulated by the control systems provided by the invention. To summarize, since the control system can regulate the peak rotor velocity, which can be directly measured as voltage fluctuations at scan angle monitor 9, it follows that the resulting rotor excursion also remains constant.

The control software has two tasks: drive the flexure with a frequency that is near the mechanical system's resonant frequency (to conserve power), and regulate the total rotor excursion by limiting the peak velocity to a constant value, if so desired.

The control algorithm of the control systems provided by the invention requires minimal computational overhead and is therefore compatible with a wide variety of low-cost, 8-bit microprocessors.

Figure 2:
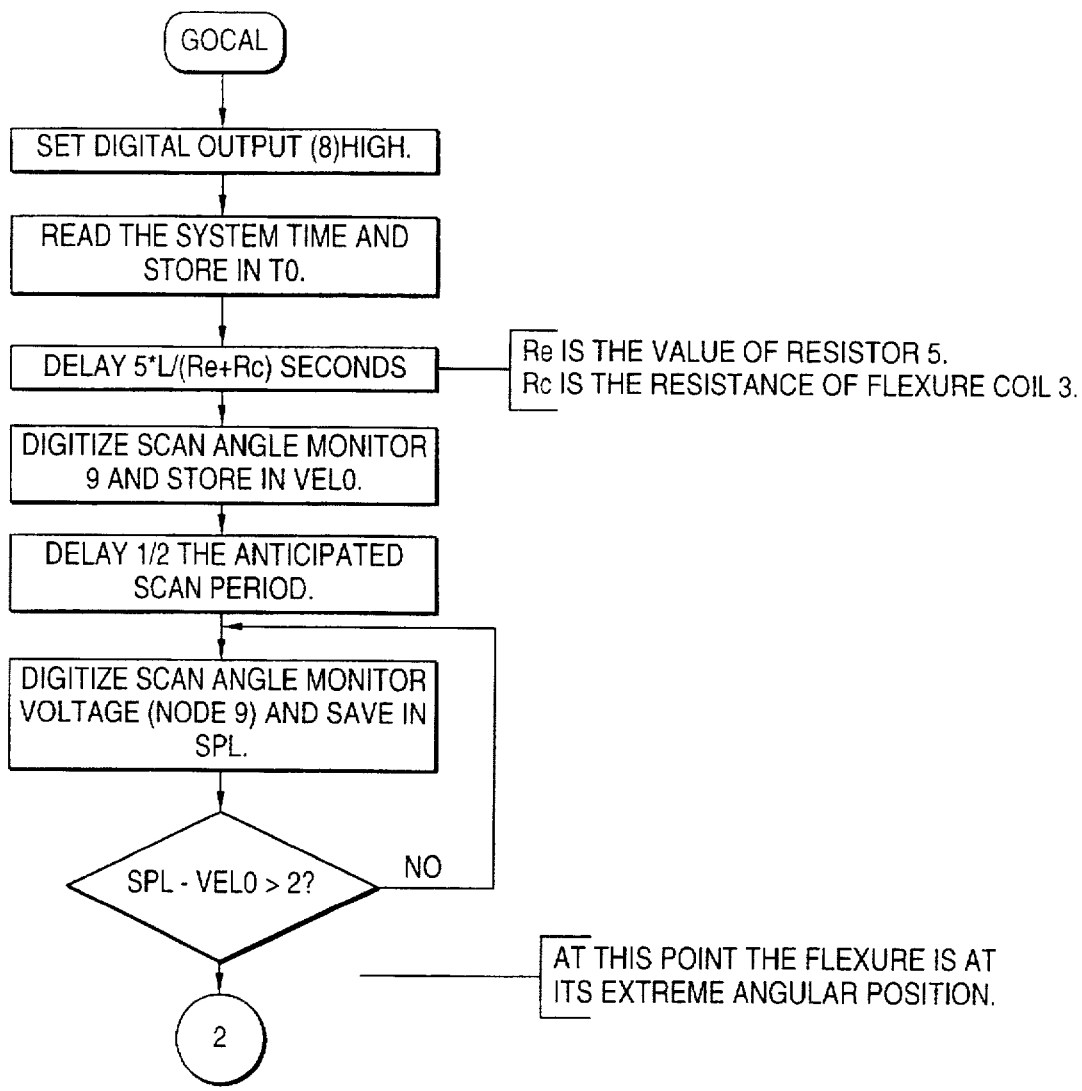
Figure 3:
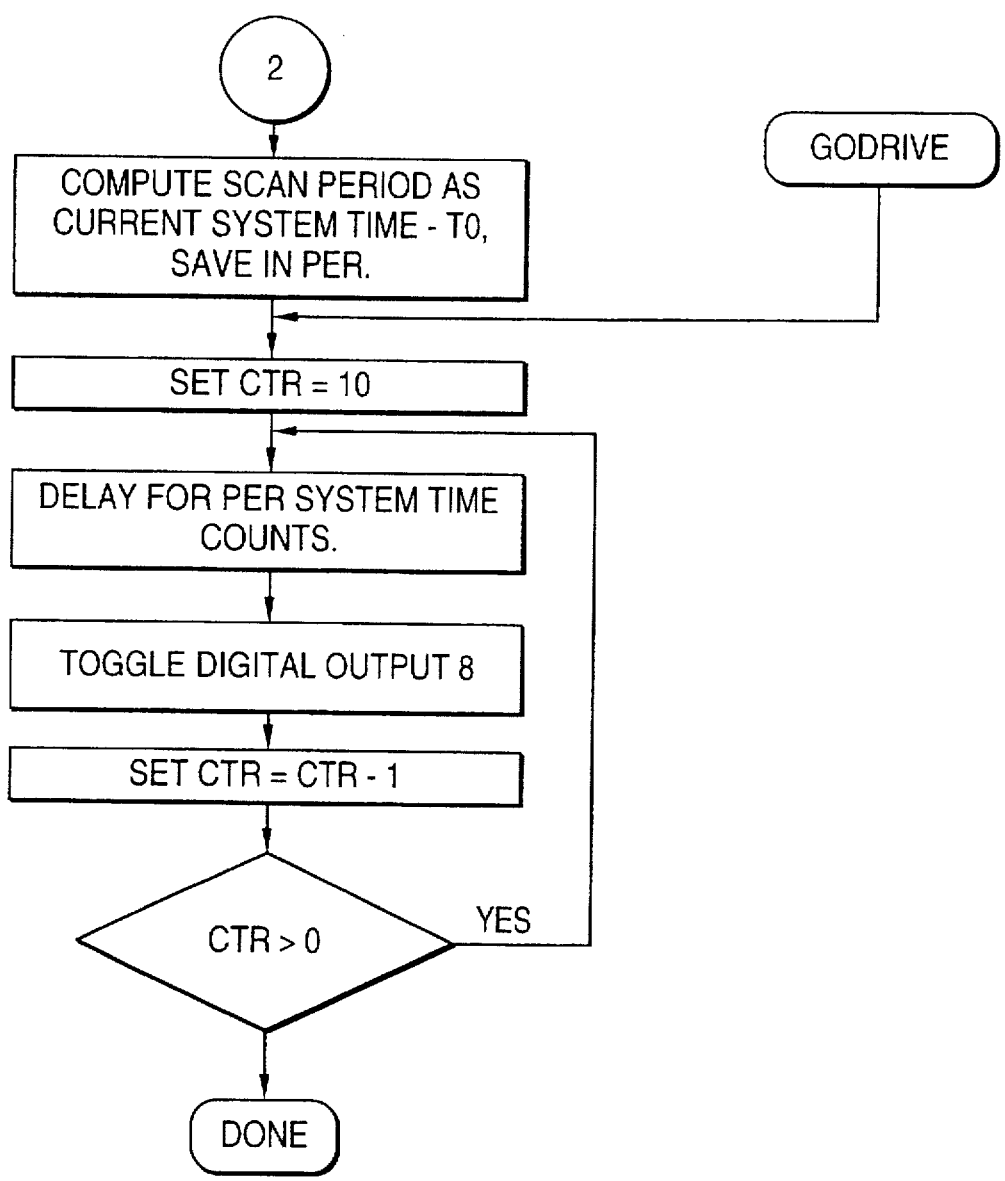

Control of the flexure is accomplished using an adaptive algorithm, illustrated in FIGS. 2 and 3 and called "Control Algorithm 1," that enables the control microprocessor to drive the flexure very near its exact resonant frequency even though several environmental factors (such as: component aging, temperature changes and supply voltage variations) cause the resonant frequency of the flexure to change. An algorithm that extends this principle, by adding closed-loop rotor excursion (scan angle) control is presented in FIGS. 4 and 5 and called "Control Algorithm 2". The control algorithms reflect the principles set forth above.

In the following and subsequent discussions, reference is made to "system time." System time is derived from the value of a digital counter within control microprocessor 7. This digital counter is clocked at a constant rate, therefore the difference between asynchronously read counter values is proportional to elapsed time, so long as the events being timed are shorter in duration than the counter's resolution, which is the product of the counter's range and the system clock period. Many commercially available microprocessors and microcontrollers have this internal time-keeping facility, and Motorola's 68HC705P6 is such a device.

FIG. 2 shows the calibration portion of the control algorithm 1, and FIG. 3 shows a short control loop that scans the flexure ten times using the period established during calibration.

During calibration, the system time is saved in T0, flexure coil 3 is energized, and, after the electrical circuit has settled {5T, where T=Lcoil/(coil 3 resistance+resistor 5 value)}, scan angle monitor 9 is digitized and saved in VELO. A delay is then observed whose duration is ½ the anticipated scan period (a precise value not necessary). This delay allows the flexure to develop sufficient speed so that the induced EMF causes scan angle monitor 9 to deviate significantly (tens to hundreds of millivolts) from the initial sample value (in VELO), preventing noise, which may be present in the system, from corrupting the scan period measurement. After the delay has expired, a sampling loop is initiated, during which time scan angle monitor 9 is repeatedly digitized and compared to the value stored in VELO. Once the rotor reaches its extreme angular position its angular velocity drops to zero causing the induced EMF to drop to zero. Since there is no longer a velocity component to reduce coil 3's current, scan angle monitor 9's voltage again matches the value stored in VELO. With the rotor now at its extreme rotation, it experiences a net torque toward its zero angle position and accelerates in that direction. With the rotor moving in this direction the induced EMF now aids the drive current causing the voltage at scan angle monitor 9 to exceed the value stored in VELO. Once scan angle monitor 9 exceeds VELO by some amount which can be experimentally determined (2 A/D counts are shown on the flow charts), the calibration period ends, and the algorithm computes the scan period to be the difference between the current system time and the starting time (TO).

The computed scan period is stored in PER and is used to generate a 50% duty-cycle waveform, whose on- and off-times are equal to PER, that is applied to digital output 9 to produce subsequent scans. Forcing scan angle monitor 9 to exceed VELO by a predetermined amount causes the calculated scan period to slightly exceed the flexure's resonant period, therefore subsequent scanning takes place at a frequency slightly below the electromechanical system's resonant frequency, which enhances noise performance.

With the control algorithm, the flexure is initially stopped, and scanning is periodically interrupted and restarted. Then the calibration portion of the algorithm periodically executes allowing the system to adjust for environmental factors, such as temperature, and supply voltage variations. The rate of resonance frequency change due to such variations is much less than the recalibration interval.

The algorithm can be modified to periodically execute the calibration section, after some predetermined number of frames have been scanned, however, in hand-held barcode scanners, this happens as a matter of course, so special attention is unnecessary.

All algorithms that control movement have two entry points: GOCAL and GODRIVE. The GOCAL entry point causes the algorithm to first measure scan period, then control the rotor. The GODRIVE entry point omits scan period measurement and drives the rotor using a previously measured scan period. The GODRIVE entry point is used after drive pulse train synchronization (which is discussed later in this application). If synchronization is not being used, or if the rotor is motionless when scanning is initiated, the GOCAL entry point is used.

| | |
|---|---|
| TO | is the system when coil 3 drive's current was initiated. TO is used as the reference time for scan period calculation. |
| VELO | is the initial sample of scan angle monitor 9. VELO is taken to be the bias value of scan angle monitor 9 since scan angle calibration is performed only when the rotor is motionless. |

-continued

| | |
|---|---|
| SPL | is the current sampled value of scan angle monitor 9. |
| PER | is the computed scan period, in units of the system time. |
| CTR | is a counter that contains the number remaining scans to be performed. |

Figure 4:
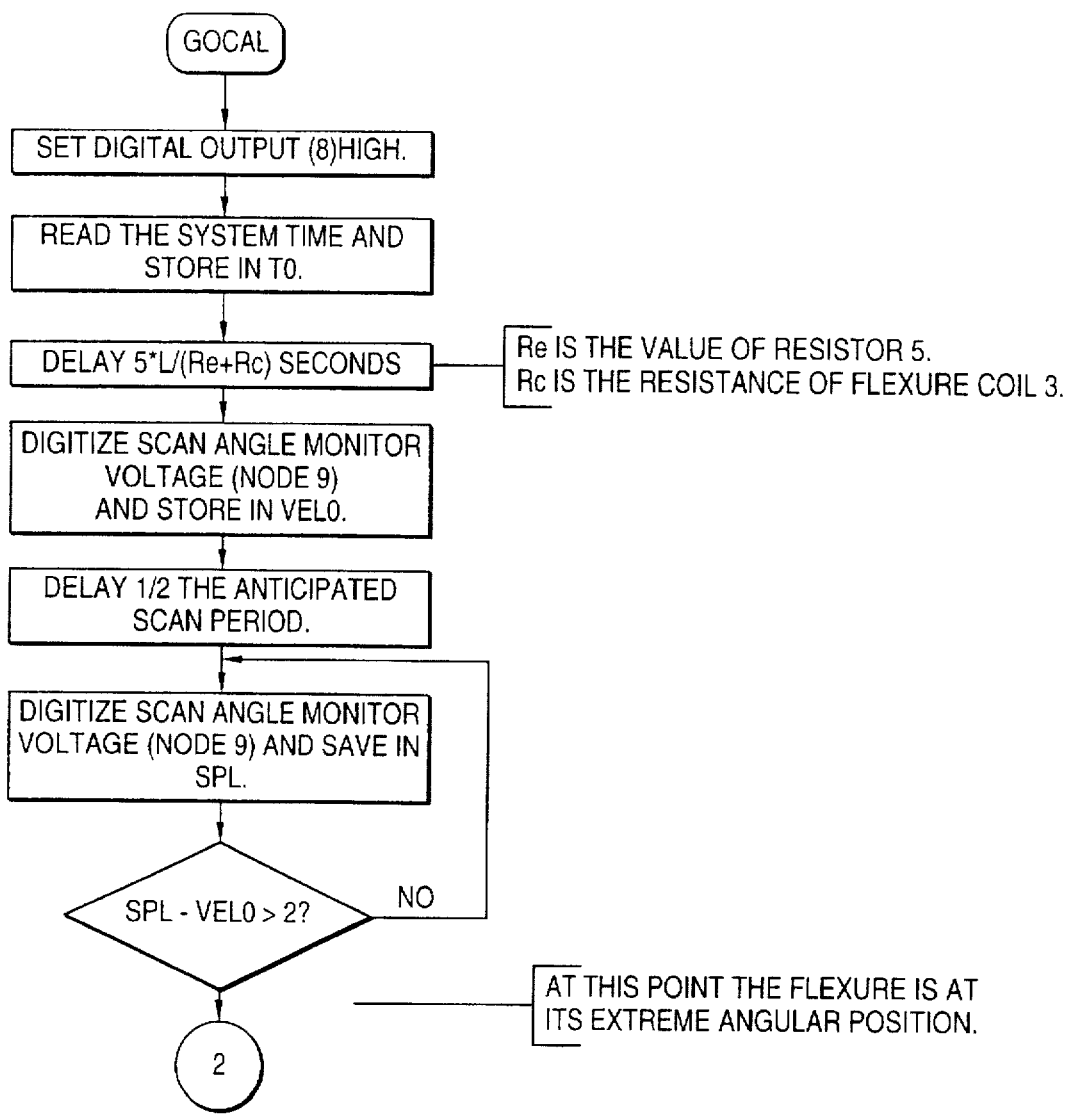
Figure 5:
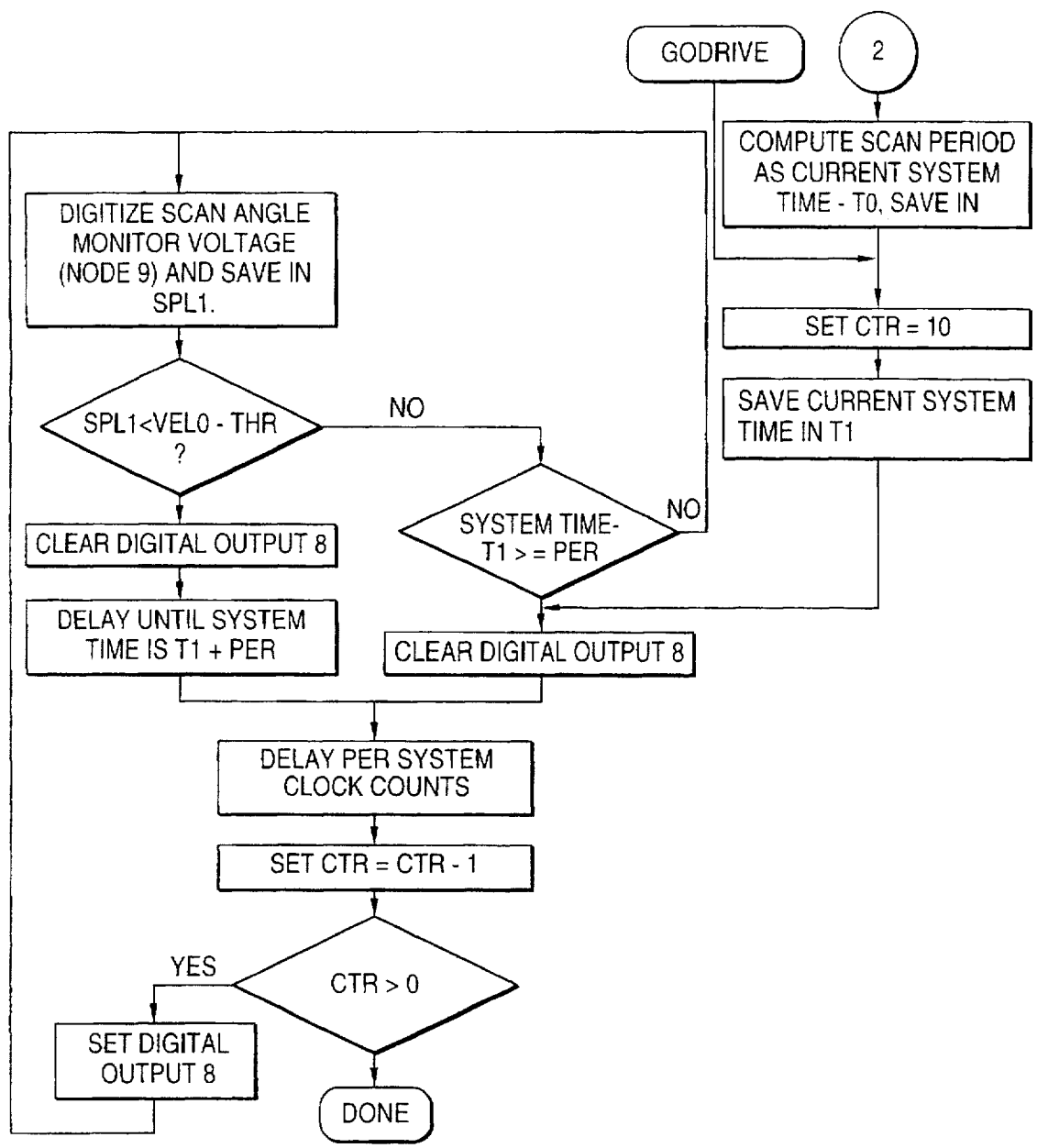

An enhanced version of Control Algorithm 1, named Control Algorithm 2, is presented in FIG. 4 and FIG. 5. Control Algorithm 2 expands on Control Algorithm 1's functionality by providing closed-loop rotor excursion control.

FIG. 4 shows the calibration phase of Control Algorithm 2, which is defined to Control Algorithm 1's calibration. FIG. 5 shows the scanning control portion that is modified to provide close-loop rotor excursion (scan angle) control. Control Algorithm 2 accomplishes scan angle control by turning off drive pulses when scan angle monitor voltage 9 becomes less than the calibration velocity minus a threshold, THR. THR is experimentally determined to produce the desired rotor excursion. The total rotor excursion is proportional to THR. THR may, for example, be from zero to B in equation 4 (in digitized voltage units) and is equal to B where maximum scan angle is desired.

Control Algorithm 2 references variables: TO, VELO, SPL, PER, CTR and the symbolic constant THR, which are described below.

| | |
|---|---|
| CTR | is a counter that contains the number remaining scans to be performed. |
| PER | is the computed scan period, in units of the system time. |
| SPL, SPL1 | are the current sampled value of scan angle monitor 9. SPL is used in the calibration loop, SPL1 in the scanning loop. |
| TO | is the system time when coil 3 drive's current was initiated. TO is used as the reference time for scan period calculation. |
| VELO | is the initial sample of scan angle monitor 9. VELO serves as a reference point for determining when the rotor has moved through its total angular excursion. VELO is taken to be the bias value of scan angle monitor 9 since scan angle calibration is performed only when the rotor is motionless. |
| THR | is a positive, nonzero constant whose value is proportional to total rotor excursion (scan angle). The value of THR is experimentally determined to produce the desired scan angle. |

As discussed above, it is desirable for flexures and other high Q electromechanical systems that the control system synchronize its pulse train to flexure movement, if flexure motion is indicated at the onset of scanning. Because of a flexure's relatively high Q factor, in conjunction with the random nature of scanning activities in hand-held barcode scanners, the flexure will sometimes be moving when scanning is initiated. Thus it is desirable to give control microprocessor 7 the ability to monitor the flexure's velocity while drive current is off. However, if the drive circuit's electrical time constant (Lcoil/the resistance connected to the coil) is small in comparison to the mechanical time-constant, which is usually the case, drive current can be pulsed just long enough to allow the electrical time constant to settle and perform an A/D conversion without affecting rotor velocity.

Figure 6:
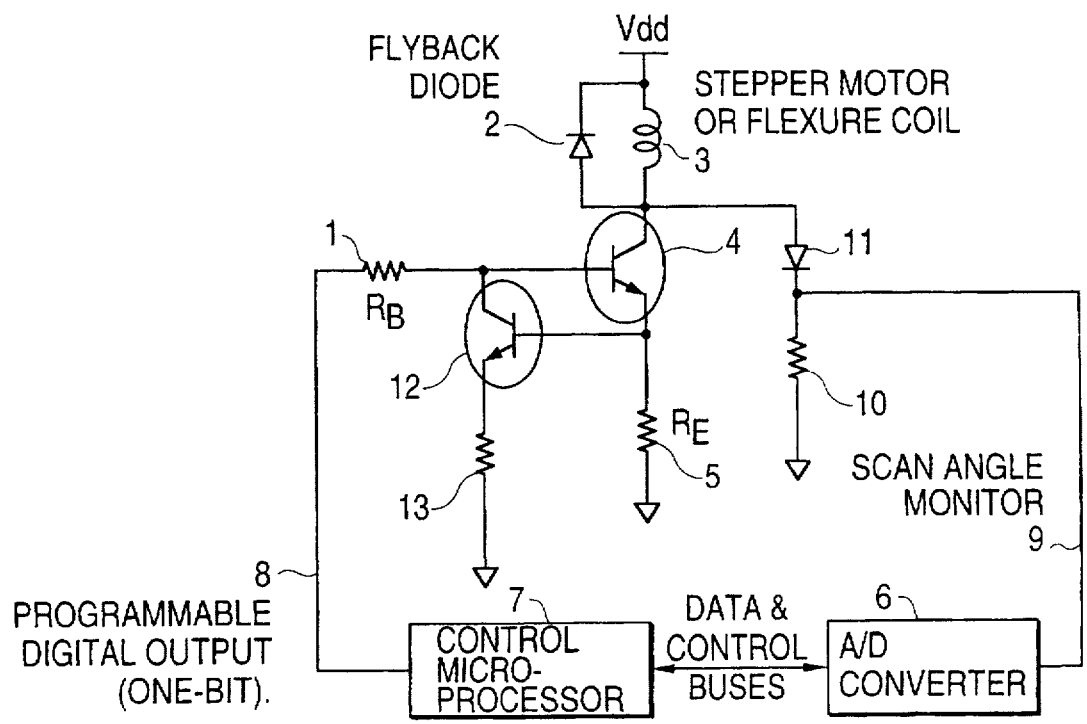
FIG. 6 is a schematic and block diagram of a system for the same purpose as the system shown in FIG. 1 in accordance with another embodiment of the invention, the system being referred to as control system 2.

Control System 2 is presented in FIG. 6 gives control microprocessor 7 the ability to continuously monitor rotor position, without affecting it, thus enhancing the ability to synchronize the drive pulse train to a moving rotor.

The circuit shown in FIG. 6 can be divided into two sections: rotor monitoring circuitry formed by diode 11 and resistor 10; and coil drive circuitry consisting of: transistors 4 and 12, resistors 1, 5 and 13, coil 3, and diode 2. Common to all control systems is A/D converter 6, control microprocessor 7, scan angle monitor 9 and programmable digital output 8.

To monitor the rotor position with coil 3 current off, scan angle monitor signal 9 is derived from the collector of transistor 4. Rotor velocity induced voltage variations are present regardless of the state of transistor 4. Diode 11 and resistor 10 form a level translation network whose output, scan angle monitor 9 is identical to the voltage at the collector of transistor 4 minus the forward voltage drop of diode 11. The level translation provided by these two components, 10 and 11, insured that scan angle monitor 9 voltage does not exceed the digitization range of A/D converter 6, without attenuating the velocity induced signal component. The digitization range of A/D converter 6 is generally between ground and the system power supply, Vdd.

As before, coil drive current is switched via control microprocessor 7's programmable digital output 8. A high level turns-on the coil drive current, and a low level turns it off. Unlike the control system presented in FIG. 1, transistor 4 saturates only during initial turn-on, once coil current 3 nears its steady-state value (ignoring coil 3's EMF signal), transistor 4 operates in its linear region (close to saturation to minimize its power dissipation). This is accomplished with the addition of a feedback circuit formed by transistor 12 and resistor 13. The feedback circuit acts to limit the coil current to a value determined by relationship between resistors 1, 5 and 13. Because transistor 4 acts as a constant current source, its impedance, looking between its collector terminal and ground, is several orders-of-magnitude larger than in the circuit presented in FIG. 1. As a result, the induced rotor EMF voltage no longer divides between the internal resistance of coil 3 and resistor 5, and is wholly present at the collector of transistor 4. Thus, the amount of signal available at scan angle monitor 9, for a given scan angle, is considerably larger than the circuit shown in FIG. 1, when coil 3's drive current is on.

Figure 7:
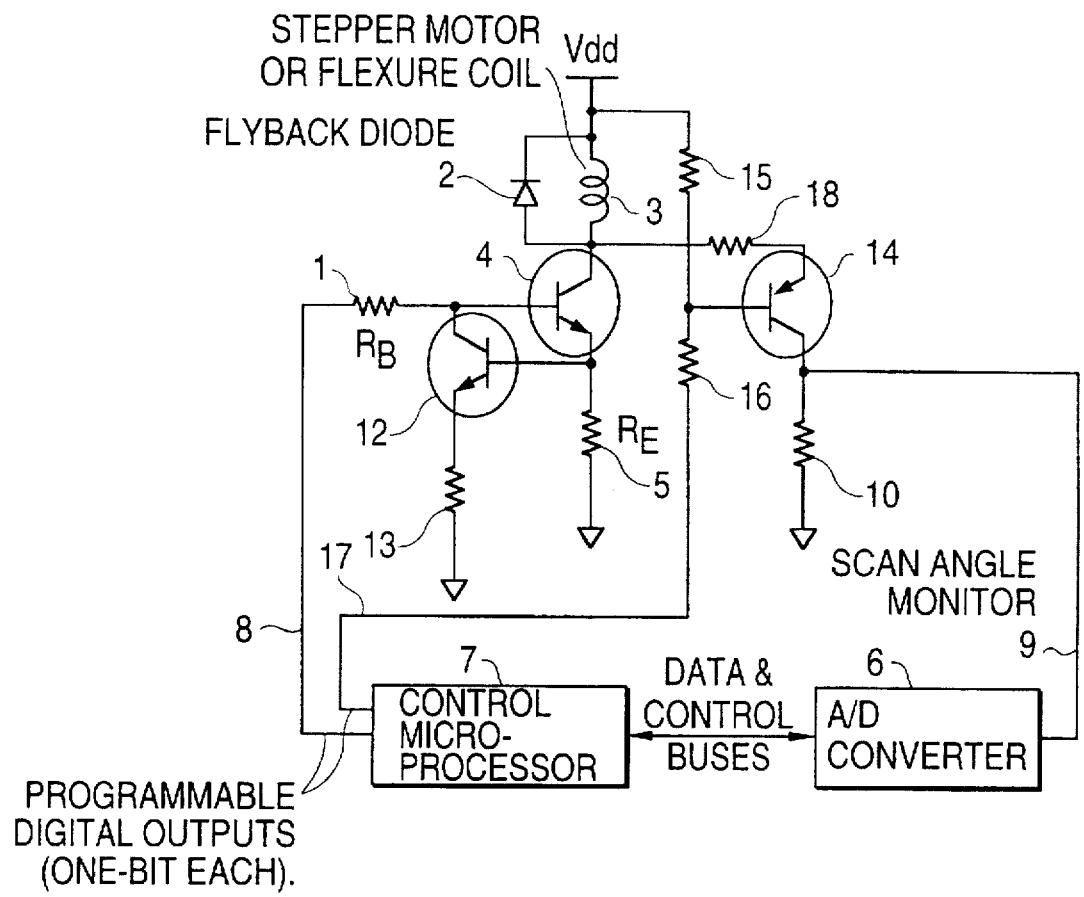
FIG. 7 is a schematic and block diagram of a driver and control system in accordance with still another embodiment of the invention and called control system 3.

Control algorithms 1 and 2 are fully applicable and may be used in the microprocessor 7 of FIG. 6 and in the control systems of FIGS. 7 and 17.

Control System 3, shown in FIG. 7, contains a minor circuit change from Control System 2 that greatly enhances several of its operating characteristics.

The first of these enhancements is the elimination of the current path through coil 3, forward biased diode 11 and resistor 10, when coil 3 is not driven by transistor 4 (in the circuit of FIG. 6). Although resistor 10 is generally large, several tens of Kohms, minimizing current flow, when the coil is not driven, the coil current is undesirable. Control System 3 replaces diode 11 of System 2 with transistor switch 14, base biasing resistors 15 and 16, stabilization resistor 18, and an additional programmable microprocessor digital output 17 that enables or disables scan angle monitoring. When digital output 17 is low, transistor 14 is on, and the scan angle monitor 9 voltage is given by:

Equation 3:
Scan angle monitor 9 voltage gain $$\frac{V_9}{V_C} \approx \frac{R_{10} \cdot H_{FE}}{R_{16} + H_{FE} \cdot R_{18}}$$

$V_9$ is the voltage at scan angle monitor 9. Vc is the voltage at the collector of transistor 4. $R_{10}$, $R_{16}$, and $R_{18}$ are the values of resistors 10, 16 and 18 respectively. $H_{FE}$ is transistor 14's forward current gain. Resistor 18 reduces the circuit's dependence on transistor 14 forward current gain.

Conversely, when digital output 17 is high, transistor 14 is off, eliminating the current path present in Control System 2. The algorithm in control microprocessor 7 firmware enables scan angle monitoring, by clearing digital output 17 when scanning is initiated. Digital output 17 is set to a logic high to conserve power when not scanning. Although earlier control algorithms do not explicitly show steps to control digital output 17, these algorithms operate to clear output 17 at the onset of calibration or scanning, and this output 17 is set when scanning terminates.

Another benefit of Control System 3 is a lower output impedance at scan angle monitor 9, and a reduction in the nonlinearity caused by diode 11 (FIG. 6). Consider the circuit's response when the coil 3 EMF causes the voltage at the collector of transistor 4 to decrease. Under these conditions, diode 11 is reversed biased (and is therefore off) because its cathode is held at a relatively constant potential by capacitance present at the input of A/D converter 6. The output impedance of Control System 2 is the value of resistor 10, which is typically in the tens of Kohms. In contrast, Control System 3 output impedance across resistor 10 is approximately the resistance of coil 3 plus the value of resistor 18, whose combined values are typically a few hundred ohms.

A third enhancement provided by the Control System 3 circuitry is the ability to amplify coil 3 EMF, as apparent from Equation 3 by virtue of the relationship of resistors 10, 16, 18 and transistor 14's forward current gain.

Drive pulse train synchronization

The control systems discussed above make continuously available rotor velocity information. Some applications require a synchronization algorithm. Fundamentally, the synchronization process operates by delaying the start of the drive pulse train to match rotor position, thereby preventing the rotor of the electromechanical system from being driven contrary to its accumulated potential and kinetic energy. Consider that a positive current through coil 3 causes positive theta rotor movement, then the synchronization process delays drive pulses until the rotor is in its extreme negative theta position.

The task of the synchronization algorithm is then twofold: determine if the flexure is moving, and if so, delay the drive pulse train until the rotor is in the correct position (extreme −θ). The synchronization algorithm, provided in accordance with the invention has the feature of practicality for implementation in a low-cost, 8-bit microprocessor.

FIG. 8 shows a typical scan angle monitor 9 signal or waveform (corresponding to movement of the rotor of the flexure). The desired starting points for drive pulses are as indicated in FIG. 8. If the coil polarity is reversed, the synchronization points shift by 180°. If the average value of scan angle monitor signal 9 where constant (and known in advance), the task of determining the time at which drive pulses should be applied would be trivial, however, this isn't the case.

The average value of the scan angle monitor 9 signal is dependent upon supply voltage and ambient temperature, and therefore changes over time. Therefore, the synchronization algorithm includes means for determining the average value of the scan angle monitor 9 signal, within acceptable error limits. The algorithm also minimizes the amount of time required to synchronize, which is desirable for both scanning system performance and energy conservation. The longer synchronization takes, more energy is lost by the coasting rotor, and the longer an operator must wait for subsequent scanning to begin.

The average value of the scan angle monitor 9 signal and finding synchronization points is accomplished by a dual-peak detection means implemented in firmware. The "peak detector" output that is discussed in the following paragraphs is a variable in microprocessor 7's memory, named PEAK. Consider first the "typical" signal at scan angle monitor 9 when drive transistor 4 is off and the flexure (or motor) is oscillating as a result of a prior scan and refer to FIG. 9.

Scan angle monitor 9 is periodically sampled. See FIGS. 10–12. A delayed copy of the sample values are created by retaining a copy of the most recent sample that is updated as each subsequent sample is available. The current and prior samples are compared. If the current sample is larger, the peak detector is set to true state. Conversely, if the current sample is smaller (than the prior sample) the peak detector is set to false state. If the samples are equal, the peak detector is unchanged. When the peak detector switches to true state, a negative waveform peak is indicated and the current scan angle monitor 9 sample is saved in NEGPEK. Likewise, when the peak detector switches to false, a positive waveform peak is detected and the current scan angle monitor 9 sample is saved in POSPEK.

Once at least three transitions of the peak detector have occurred and the most recent transition is negative (true to false transition), the values of NEGPEK and POSPEK are averaged to compute the average value of scan angle monitor 9. After computing the average value, the algorithm enters a sampling loop waiting for a sample less-than or equal-to the computed average. Once such a sample is found, the rotor is synchronized and control is passed to the scanning portion, GODRIVE, of either of the scanning routines discussed earlier. A few points from the preceding discussion need refinement.

The electromechanical system's step response can be shown to be of the form:

Equation 4: Scan Angle Monitor 9 Step Response $$V_{monitor} = B_s^{-at} \cdot COS(\omega_o t) + C$$

$V_{monitor}$ is the voltage at scan angle monitor 9. The constant B is the electromagnetic coupling coefficient, in units of volts per radian per second, and C is the bias voltage of scan angle monitor 9. $\omega_0$ is the system's resonant frequency, in radians per second. The positive, nonzero constant "a" is the system damping factor. The larger a the more quickly oscillation decays.

The algorithm finds two consecutive peak values (one positive the other negative), and computes their average as the value of constant C (in Equation 4). Because the oscillation is decaying in time, the average of two consecutive waveform peaks may not exactly equal to the constant C, however, it can be shown that for flexure drive and control systems, the error to be well under 5%. As the system's Q decreases (as indicated by increasing "a" in Equation 4), the error increases, but at the same time oscillation in these systems decays more quickly, so synchronization is not as important. Conversely, as Q increases (decreasing "a"), error is minimized.

Three peak detector transitions are used. Since the rotor's position is random when synchronization begins, an initial transition can be detected immediately depending upon the initialization state of the peak detector and the slope of scan angle monitor 9 when synchronization begins. Therefore, the first transition is generally meaningless (so they all must be ignored).

Note the omission of calibration after synchronization in the algorithm of FIGS. 10–12 as by passing control to GODRIVE after synchronization is established according to algorithm 1 and 2 (FIGS. 3 and 5). If the rotor is in motion the prior measurement of scan period is still valid and need not be measured. Depending upon the relationship between electrical and mechanical time constants, attempting to measure the scan period with the rotor in motion can lead to measurement errors that are proportional to the rotor's initial excursion angle. Under these circumstances scan period measurement is not desirable.

The algorithm shown in FIGS. 10–12 references variables named: MOTION, SAMPLES, SPLTIME, SAMPLE, FSAMPLE, PEAK, PEAKS, AVG, POSPEK, NEGPEK and symbolic constants named: TS, MOTTHR, SPS and SCN-PER. A description of these symbols follows:

| | |
|---|---|
| MOTION | is a Boolean value that is nonzero to indicate rotor motion has been detected. Rotor motion is indicated when the absolute difference between the initial scan angle monitor 9 sample and any subsequent sample exceeds the symbolic constant MOTTHR. |
| SAMPLES | is the total number of samples (of scan angle monitor 9) that have been taken. SAMPLES is used to limit the synchronization process to reasonable duration and set time limits on the various phases of synchronization. |
| SPLTIME | is the next system at which a sample is to be taken. As in earlier algorithms, it is assumed that the microprocessor has a free-running counter, called "system time" that is clocked by a fixed frequency clock. In this manner, the difference between successive values of "system time" is proportional to elapsed time. |
| SAMPLE | is the most recent sample of scan angle monitor 9. |
| OLDSPL | is the prior sample of scan angle 9. |
| FSAMPLE | is the first sample of scan angle monitor 9. Successive samples are compared with this value to determine if the rotor is in motion. |
| PEAK | is the value of the peak detector output. PEAK is set to 1 to indicate a negative peak has occurred, or zero to indicate a positive peak has occurred. |
| PEAKS | is the number of transitions that have occurred on the peak detector, PEAK. |
| POSPEK | is the value of SAMPLE at the most recently detected positive waveform peak. |
| NEGPEK | is the value of SAMPLE at the most recently detected negative waveform peak. |
| AVG | is the numerical average of POSPEK and NEGPEK. AVG is computed after at least three transitions of PEAK have occurred as indicated by the value of PEAKS begin greater than two, and when the most recent PEAK transition was from a "1" to a "0". |
| TS | is the sample period, measured in units of system time. TS establishes the sampling rate of scan angle monitor 9. The optimal value of TS is experimentally determined based on system performance, but generally lies in the range of ten to 200 samples per scan, see SPS below. TS is computed using Equation 5. As the algorithm is shown, there is better than a 50% error tolerance in the rotor's actual oscillation period and the computed value of TS. |

Equation 5: A/D Sample period Calculation $$TS = \frac{F_{system_{clock}} \cdot t_{scan}}{SPS}$$

where $F_{system\_clock}$ is the system clock frequency, in Hertz, and
$t_{scan}$ is the nominal scan period, in seconds
MOTTHR is a symbolic constant that defines the minimum (absolute) difference between FSAMPLE and subsequent samples to qualify the rotor as moving. MONTHR is taken as the peak deviation of scan angle monitor 9, produced by a five degree total rotor excursion.

-continued

|      |                                                                                                                                                    |
| ---- | -------------------------------------------------------------------------------------------------------------------------------------------------- |
|      | MONTHR has the same voltage units as are measured by the A/D converter.                                                                            |
| SPS  | is the nominal number of samples taken per scan. SPS is experimentally determined based on optimal system performance, but usually lies between 10 and 200. |
| SCNPER | is the nominal scan period, in the same units as system time.                                                                                    |

After initializing variables, the algorithm of FIGS. 10–12 establishes a periodic sampling loop using the system clock in conjunction with SPLTIME. Each time the system clock matches or exceeds SPLTIME, scan angle monitor 9 is digitized by A/D converter 6, the total number of samples (SAMPLES) is incremented, the prior sample is copied into OLDSPL, SPLTIME is advanced by the desired sampling period and the digitized value is stored in SAMPLE. The first time the loop executes, the sampled value of scan angle monitor 9 is also saved in FSAMPLE>On the second (and subsequent) executions of the sampling loop, prior to rotor motion detection, indicated by MOTION being zero, the sampled value of scan angle monitor 9 is compared to FSAMPLE. When their absolute difference exceeds MONTHR, motion is indicated by setting MOTION to 1. If motion is not detected within one scan period, the flexure is not moving and the calibration portion of either of the normal scanning algorithms is invoked by control passing to the GOCAL exit point.

Once motion is detected, peak detection begins. OLDSPL and SAMPLE are compared to determine the peak detector output value. The peak detector is set when SAMPLE exceeds OLDSPL, cleared when OLDSPL exceeds SAMPLE, or unchanged if the two values are equal. Once the correct state of the peak detector (PEAK) is determined, an additional test determines whether PEAK is changing states, or whether it is already in the correct state. If PEAK is changing state, its value is updated and the number of peaks detected, PEAKS, is incremented. If PEAK is being set, NEGPEK is updated with the value of SAMPLE. Conversely, if PEAK is being cleared, POSPEK is updated with the value of SAMPLE.

After three peaks have been detected, and the most recent change in PEAK was from a one to zero, the numerical average of POSPEK and NEGPEK is computed and stored in AVG. The algorithm then enters a second sampling loop, waiting for the digitized voltage at scan angle monitor 9 to equal or fall below the computed average value (AVG), indicating that synchronization has occurred. If, during the second sampling loop, the digitized scan angle monitor 9 signal does not fall below or equal to AVG within one scan period, one of the normal scanning algorithms are invoked, again, by control passing to the GOCAL exit point. Under these conditions, it is assumed that the flexure's movement has decayed to a small scan angle and synchronization is no longer required.

When synchronization is successfully established (by exiting to the GODRIVE) label on FIG. 12, the calibration portion of either of the drive algorithms is skipped, and control is directly passed to the scanning portion.

The control systems provided by the invention may be adapted for stepper motor drive 2 control by incorporating the algorithm of FIGS. 13–16 in the computers of the systems, as in firmware of the microprocessor 7. Consider that two-phase stepper-motor oscillating systems, with one phase DC biased, can exhibit a nonlinear relationship between rotor angle and torque (the equivalent of $T_{flex}$), that is exhibited as a torque imbalance between counter-clockwise and clockwise angular deflection. This type of torque imbalance, particularly noticeable in low-cost stepper-motors, may result from assembly tolerances. The imbalance manifests itself as a difference between the motor's forward and reverse scan periods, or in other words, the amount of time required for a rotor to rotate between its extreme angular positions under constant drive conditions. Control Systems 2 and 3 are best by adapted to compensate for this type of nonlinear behavior by incorporating 'Stepper Motor' Control Algorithm, of FIGS. 13–16 which is described below. Like the other algorithms, there are two parts: calibration and scanning. The calibration portion is shown in flow charts FIG. 13 and FIG. 14, the scanning portion in FIG. 15 and FIG. 16.

During calibration, the algorithm measures the forward scan period in the same manner as Control Algorithms 1 and 2. Coil 3's drive current is initiated by setting digital output 9, a delay is observed waiting for the electrical circuit to settle, scan angle monitor 9 is then digitized and stored in VELO. The algorithm delays ½ the nominal scan period, and initiates a sampling loop, where successive samples of scan angle monitor 9 are compared to VELO. Once a sample that is two counts greater than VELO is detected, the current system time is stored in T1, and drive coil 3 is turned off by clearing digital output 9.

Once coil 3 is turned off (by clearing digital output 9), a second dealy is used that allows the electrical circuit to settle. Scan angle monitor 9 is then digitized and saved in VEL1. As during the forward scan period measurement, the algorithm delays ½ of the anticipated scan period then initiates a sampling loop. During the sampling loop, scan angle monitor 9 is continuously digitized and compared to VEL1. Once the digitized value is less than VEL1 by two AID counts, calibration ends, and the forward and reverse scan periods are calculated and stored in $T_{forward}$ and $T_{reverse}$, respectively.

Figure 15:
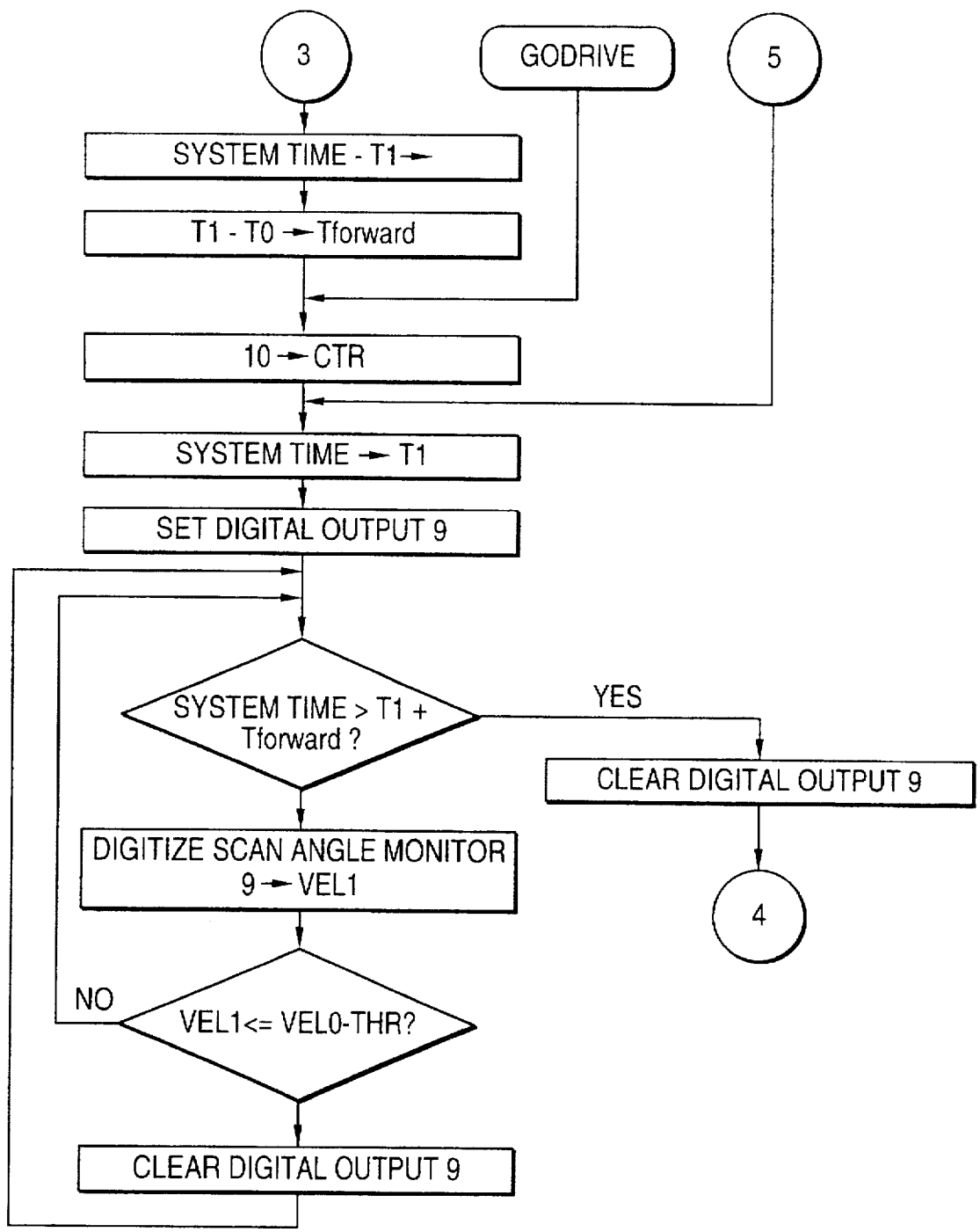
Figure 16:
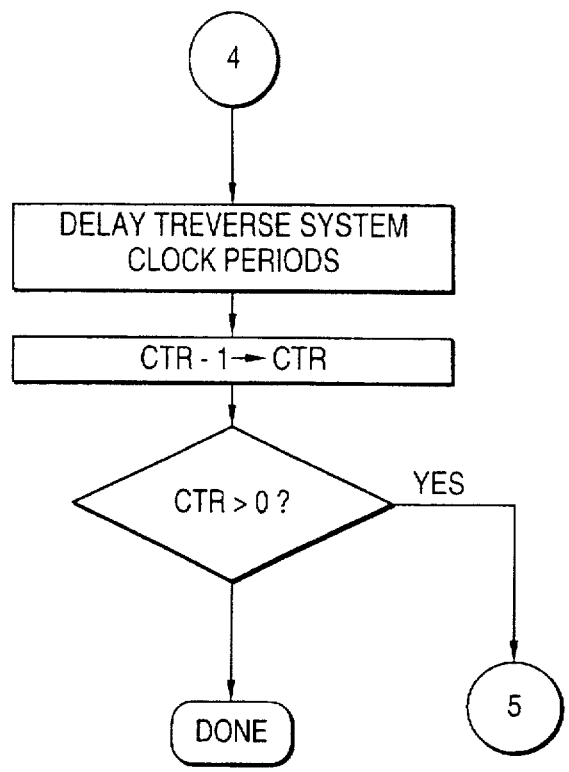

FIG. 15 and FIG. 16 show a sample scanning control loop that performs ten scans while regulating scan angle (total rotor angular excursion), using the same technique as Control Algorithm 2. Unlike algorithm 2, the drive and off periods are not necessarily equal, instead they are the values measured during calibration, $T_{forward}$ and $T_{reverse}$ respectively.

Stepper Motor Control Algorithm references variables: TO, VELO, SPL, T1, VEL1, $T_{FORWARD}$, $T_{REVERSE}$, CTR, and the symbolic constant THR, defined as follows:

| | |
|---|---|
| TO | is the system time at which coil 3 current was initiated. TO is used as a reference time for the forward scan period calculation. |
| VELO | is the initial sample of scan angle monitor 9 taken at the start of the forward scan period. VELO serves as a reference point for determining when the rotor has moved through its total forward angular excursion. VELO is taken to be the bias value of scan angle monitor 9 when transistor 4 is on. |
| SPL | is the sampled value of scan angle monitor 9. |
| T1 | is the system time at which the forward scan ended and the reverse scan began. The difference between T1 and TO is the forward scan period. |
| VEL1 | is the initial sample of scan angle monitor 9 taken at the start of the reverse scan period. VEL1 serves as a reference point for determining when the rotor has moved through is total reverse angular excursion. VEL1 is taken to be the bias voltage of scan angle monitor 9 when transistor 4 is off. |
| $T_{FORWARD}$ | is the measured forward scan period, the difference between T1 and TO. |
| $T_{REVERSE}$ | is the measured reverse scan period. |

| | |
|---|---|
| CTR | counts the number of scans performed during scanning. |
| THR | is a positive, nonzero constant whose value is proportional to total rotor excursion (scan angle). The value of THR is experimentally determined to produce the desired scan angle. |

Next consider how the control systems may be programmed for start of scan (SOS) signal generation. When driving a resonant flexure, or oscillating stepping motor, the mechanical motion lags the electrical drive signal by an amount determined by the system's Q, and the deviation of the drive frequency from the exact system resonance frequency, as described by the following Laplace equation (this is derived from Equation 4).

Equation 6:
Oscillating System Equation $$L(s) = \frac{\omega_0}{(a+s)^2 + \omega_0}$$

Where as in equation 4, $\omega_0$ is the resonant frequency in radians per second, L(S) is the Laplace transform and S is the Laplace operator. The system's resonant frequency is the point at which the phase-lag is exactly 90°, or ½ a scan period. During oscillation start-up, the phase relationship between the electrical drive signal and the resulting rotor motion varies from zero to 90° as the rotor's excursion increases from zero to its steady-state value.

Either Control System 2 or Control System 3 can exploit their ability to continuously monitor rotor velocity to generate the SOS signal under firmware control. The Δpeak detection processor scan angle monitor 9 is used. The peak detector signal is an image of the SOS signal. Effectively, the peak detection algorithm is combined with Control Algorithm 2 shown in FIG. 4 and FIG. 5. The revised algorithm, named 'SOS Generation Algorithm' is shown in FIGS. 18–22.

The SOS Generation Algorithm references variables: TO, VELO, SPL, T1, PER, FRCTR, SPLTIME, FRMTIME, OLDSPL and the symbolic constant: THR which are defined as follows. TO, VELO, SPL, PER, OLDSPL and THR are defined below.

| | |
|---|---|
| T1 | is set to the value of system time at which scanning begins. It allows the algorithm to be entered from calibration or from its GODRIVE entry point. |
| FRCTR | counts the number of scans performed. FRCNT is also used differentiate the forward scan from the reverse scan, as indicated by its value being even or odd. During forward scans scan angle control is performed. |
| SPLTIME | is the next system time at which a peak detector sample is to be processed. SPLTIME is used in conjunction with TS to establish the sampling rate for SOS generation. |
| FRMTIME | is the system time at which the current scan will be complete. FRMTIME is advanced in increments of the measured scan period, PER. |

From the foregoing description it will be apparent that there has been described improved computerized drive and control systems for driving and controlling the motion and displacement of electromechanical oscillatory systems which are especially useful in scanners, such as bar code scanners, for projecting a scanning beam and which is positioned to receive return light from a bar code as it is scanned by the beam. Variations and modifications in the herein described system and applications therefor, in addition to bar code scanning, within the scope of the invention, will undoubtedly become apparent to those skilled in the art. Accordingly, the foregoing description should be taken as illustrative and not in a limiting sense.

I claim:

1. A system for driving and controlling the motion of an oscillatory electromechanical system having an electromagnetic actuator including a single coil and magnetic field producing means which move with respect to each others, said system comprising:
    means for applying device pulses to said coil and for monitoring a signal induced in said coil representing the position of said coil as said system oscillates;
    means responsive to said position representing signal for computing the period of oscillation; and
    means responsive to said computed period for generating driving pulses at a selected repetition rate for operating said applying means.

2. The system according to claim 1 wherein said oscillation is about an axis of rotation, and said position is the angular displacement of said system about said axis.

3. The system according to claim 2 wherein said system comprises a rotor having means for applying a restoring force in opposite directions with respect to a position where said rotor is at rest.

4. The system according to claim 3 wherein said restoring force applying means are flexural supports for said rotor.

5. The system according to claim 3 wherein said coil is a coil of a stepper motor, said stepper motor having a plurality of coils and means for passing bias current to at least one of said plurality of coils.

6. The system according to claim 1 further comprising means in said generating means for providing said driving pulses in synchronism with said oscillation of said system.

7. The system according to claim 6 wherein said system is resonant at a certain period of oscillation, and said synchronism providing means includes means responsive to said position representing signal for generating said driving pulses in synchronism with said oscillation of said system.

8. The system according to claim 1 wherein said applying means includes a transistor in series with said coil and a first resistor, said generating means is a computer for applying control pulses to said transistor, and said means responsive to said position representing signal comprises means for digitization thereof for presenting successive digital signals corresponding thereto for processing by said computer.

9. The system according to claim 8 wherein a second transistor is connected in amplifying relationship with said first transistor, and a third transistor is connected to said coil for obtaining said position representing signal, said third transistor being in switching relationship with said first transistor.

10. The system according to claim 8 wherein said computer has means for delaying said sucessive digital signals for a duration about equal to one-half the period of said oscillation.

11. The system according to claim 8 wherein said computer has means for delaying said digital signals by a multiple of a time constant corresponding to the ratio of the inductance of said coil to the resistance of said coil and the resistance connected in series therewith via said first transistor.

12. The system according to claim 9 wherein said third transistor has gain and amplifies said position representing signal.

13. The system according to claim 8 wherein said computer has means for obtaining the peaks of said position representing signal and for synchronizing said drive pulses with said peaks.

14. The system according to claim 5 wherein said computer has means for deriving said driving pulses in accordance with durations of said oscillation in each opposite direction of oscillation for obtaining said driving pulses with timing to compensate for imbalance in torque of said motor when rotating in opposite directions.

15. The system according to claim 13 wherein said computer has means for responsive to said pulses generating an SOS signal having a period corresponding to the period of said oscillations.

16. The system according to claim 1 wherein said electromechanical system has means which oscillate therewith for projecting and scanning a laser beam over a field of view.

17. The system according to claim 1 wherein said electromechanical system includes means which oscillate therewith for collecting return light from said field of view from the same direction in which the beam is projecting.

* * * * *